(12) United States Patent
Kobayashi et al.

(10) Patent No.: US 7,012,764 B2
(45) Date of Patent: Mar. 14, 2006

(54) PROJECTION LENS

(75) Inventors: Takeshi Kobayashi, Sano (JP); Kumajiro Sekine, Sano (JP)

(73) Assignee: Sekinos Co., Ltd., Sano (JP)

( * ) Notice: Subject to any disclaimer, the term of this patent is extended or adjusted under 35 U.S.C. 154(b) by 0 days.

(21) Appl. No.: 11/041,364

(22) Filed: Jan. 25, 2005

(65) Prior Publication Data
US 2005/0168840 A1 Aug. 4, 2005

(30) Foreign Application Priority Data
Jan. 30, 2004 (JP) .............................. 2004-023858

(51) Int. Cl.
*G02B 9/60* (2006.01)
*G02B 9/34* (2006.01)

(52) U.S. Cl. ...................................... 359/763; 359/649
(58) Field of Classification Search ................ 359/763, 359/764, 714, 753, 649
See application file for complete search history.

(56) References Cited

U.S. PATENT DOCUMENTS 4,776,681 A * 10/1988 Moskovich ................. 359/763
4,838,670 A * 6/1989 Ueda et al. ................. 359/764
5,296,967 A * 3/1994 Moskovich ................. 359/649
2004/0130798 A1 * 7/2004 Zhang et al. ............... 359/649

FOREIGN PATENT DOCUMENTS

JP 2000-081569 3/2000

* cited by examiner

*Primary Examiner*—Georgia Epps
*Assistant Examiner*—Alicia M Harrington
(74) *Attorney, Agent, or Firm*—Bacon & Thomas, PLLC

(57) ABSTRACT

A projection lens, for enlarging and projecting a picture formed on a flat fluorescent plate of a CRT projection tube, includes: a first lens unit of a plus lens, having aspheric surfaces on both surfaces, being convex to the screen side at a central portion including an optical axis, a second lens unit of a minus lens, having aspheric surfaces on both surfaces, being concave to the screen side at a central portion including an optical axis; a third lens unit of a plus lens, having spherical surfaces on both surfaces, being convex on both sides; a fourth lens unit of a plus lens, having aspheric surfaces on both surfaces thereof, being curved in concave-like to the screen side, on a peripheral portion far from the optical axis into a radial direction; and a fifth lens unit of a minus lens, being made up with a transparent liquid, commonly serving a faceplate of the CRT projection tube and a cooling, and a meniscus lens, having a thickness being nearly equal to and at least an aspheric surface directing a concave surface thereof to the screen side.

7 Claims, 23 Drawing Sheets

FIG. 3

FIRST EMBODIMENT $f_0 = 78.00$ mm  F/no = 1.03  $2\omega = 69.5°$
M = -1/10.63×  L = 914.1596 mm

| SURFACE NO. i | CURVATURE RADIUS $R_i$ | SURFACE DISTANCE $D_i$ | REFRACTIVE INDEX $N_d$ | ABBE NUMBER $\nu_d$ |
|---|---|---|---|---|
| 1 | 137.49822 | 6.5000 | 1.48986 | 58.0 |
| 2 | 635.08383 | 4.0000 | 1.0 | |
| 3 | ∞ | 4.0000 | 1.0 | |
| 4 | -72.74419 | 6.2000 | 1.48986 | 58.0 |
| 5 | -84.69916 | 12.0000 | 1.0 | |
| 6 | 85.80000 | 20.5000 | 1.58913 | 61.3 |
| 7 | -158.60000 | 27.6259 | 1.0 | |
| 8 | 657.83504 | 7.8000 | 1.48928 | 57.5 |
| 9 | -207.07329 | 33.0000 | 1.0 | |
| 10 | -31.25726 | 3.2000 | 1.48874 | 58.2 |
| 11 | -35.00000 | 7.0000 | 1.43331 | 52.0 |
| 12 | ∞ | 4.0000 | 1.71506 | 62.6 |
| 13 | ∞ | 0 | 1.0 | |

FIG. 4

FIRST EMBODIMENT
ASPHERIC SURFACE COEFFICIENTS

|     | 1ST SURFACE    | 2ND SURFACE    | 4TH SURFACE    | 5TH SURFACE    |
|-----|----------------|----------------|----------------|----------------|
| k   | 0              | 0              | 0              | 0              |
| A3  | -0.7868566E-05 | 0              | 0.2390874E-04  | 0.2149626E-04  |
| A4  | 0.8572930E-07  | -0.1800515E-05 | -0.2551912E-05 | -0.2389884E-05 |
| A5  | -0.3976523E-06 | 0              | 0.6431416E-06  | 0.4791227E-06  |
| A6  | 0.2658230E-07  | 0.2564734E-08  | -0.2840851E-07 | -0.1879257E-07 |
| A7  | -0.8944650E-09 | 0              | 0.6701279E-09  | 0.2525756E-09  |
| A8  | 0.1239756E-10  | -0.1586842E-11 | -0.7628166E-11 | -0.1724545E-12 |
| A9  | 0              | 0              | 0              | 0              |
| A10 | -0.9371251E-15 | 0.3638314E-15  | 0.3880091E-15  | -0.3811385E-15 |

|     | 8TH SURFACE    | 9TH SURFACE    | 10TH SURFACE   | 11TH SURFACE   |
|-----|----------------|----------------|----------------|----------------|
| k   | 0              | 0              | -0.1000000E+01 | -0.5000000E+00 |
| A3  | 0              | 0              | -0.5909697E-04 | 0              |
| A4  | -0.1152630E-05 | -0.6290405E-06 | 0.1325392E-04  | 0              |
| A5  | 0              | 0              | -0.1441446E-05 | 0              |
| A6  | -0.1178770E-08 | -0.1189226E-08 | 0.7067087E-07  | 0              |
| A7  | 0              | 0              | -0.1793932E-08 | 0              |
| A8  | 0.2281607E-12  | 0.5697044E-13  | 0.1936716E-10  | 0              |
| A9  | 0              | 0              | 0              | 0              |
| A10 | -0.6553859E-15 | -0.3132055E-15 | -0.1081696E-14 | 0              |

FIG. 11

SECOND EMBODIMENT
$f_0 = 78.00$ mm  F/no = 1.03    $2\omega = 69.3°$
$M = -1/10.52\times$  L = 916.0996 mm

| SURFACE NO. i | CURVATURE RADIUS $R_i$ | SURFACE DISTANCE $D_i$ | REFRACTIVE INDEX $N_d$ | ABBE NUMBER $\nu_d$ |
|---|---|---|---|---|
| 1 | 175.61888 | 6.5000 | 1.48986 | 58.0 |
| 2 | -5596.65078 | 6.0000 | 1.0 | |
| 3 | ∞ | 2.3398 | 1.0 | |
| 4 | -76.93429 | 6.2000 | 1.48986 | 58.0 |
| 5 | -91.64332 | 12.0000 | 1.0 | |
| 6 | 82.70000 | 20.5000 | 1.58913 | 61.3 |
| 7 | -170.00000 | 28.0000 | 1.0 | |
| 8 | -3360.14636 | 7.8000 | 1.48928 | 57.5 |
| 9 | -143.58874 | 32.5792 | 1.0 | |
| 10 | -30.21986 | 3.2000 | 1.48874 | 58.2 |
| 11 | -35.00000 | 7.0000 | 1.43331 | 52.0 |
| 12 | ∞ | 4.0000 | 1.71506 | 62.6 |
| 13 | ∞ | 0 | 1.0 | |

SECOND EMBODIMENT    FIG. 12
ASPHERIC SURFACE COEFFICIENTS

| | 1ST SURFACE | 2ND SURFACE | 4TH SURFACE | 5TH SURFACE |
|---|---|---|---|---|
| k | 0 | 0 | 0 | 0 |
| A3 | 0 | 0 | 0.5494003E-04 | 0.5419206E-04 |
| A4 | -0.3528896E-05 | -0.2569259E-05 | -0.5401910E-05 | -0.6860348E-05 |
| A5 | 0 | 0 | 0.7148565E-06 | 0.8088350E-06 |
| A6 | 0.8955993E-09 | 0.4164929E-08 | -0.2011398E-07 | -0.2942058E-07 |
| A7 | 0 | 0 | 0.1734133E-09 | 0.3931232E-09 |
| A8 | -0.2348557E-12 | -0.2209955E-11 | 0.8216736E-12 | -0.3397533E-12 |
| A9 | 0 | 0 | 0 | 0 |
| A10 | 0.5175533E-16 | 0.3987653E-15 | -0.3433038E-15 | -0.4442693E-15 |

| | 8TH SURFACE | 9TH SURFACE | 10TH SURFACE | 11TH SURFACE |
|---|---|---|---|---|
| k | 0 | 0 | -0.1000000E+01 | -0.5000000E+00 |
| A3 | 0 | 0.1924254E-04 | 0.2854411E-05 | 0 |
| A4 | -0.1690623E-05 | -0.4109779E-05 | 0.5450801E-05 | 0 |
| A5 | 0 | 0.2495568E-06 | -0.8662188E-06 | 0 |
| A6 | -0.1617246E-08 | -0.1278236E-07 | 0.4907720E-07 | 0 |
| A7 | 0 | 0.2665371E-09 | -0.1438261E-08 | 0 |
| A8 | 0.3767355E-12 | -0.2488812E-11 | 0.1810604E-10 | 0 |
| A9 | 0 | 0 | 0 | 0 |
| A10 | -0.6870524E-15 | -0.2731946E-15 | -0.1463806E-14 | 0 |

FIG. 16

THIRD EMBODIMENT $f_0 = 78.00$ mm  F/no = 1.03   $2\omega = 69.3°$
$M = -1/10.63 \times$  L = 915.2791 mm

| SURFACE NO. i | CURVATURE RADIUS $R_i$ | SURFACE DISTANCE $D_i$ | REFRACTIVE INDEX $N_d$ | ABBE NUMBER $\nu_d$ |
|---|---|---|---|---|
| 1 | 137.36161 | 6.5000 | 1.48986 | 58.0 |
| 2 | 637.82508 | 3.9750 | 1.0 | |
| 3 | ∞ | 4.0000 | 1.0 | |
| 4 | −72.86618 | 6.2000 | 1.48986 | 58.0 |
| 5 | −85.04907 | 11.9676 | 1.0 | |
| 6 | 85.80000 | 20.7200 | 1.58913 | 61.3 |
| 7 | −158.60000 | 27.5930 | 1.0 | |
| 8 | 665.76446 | 7.8000 | 1.48928 | 57.5 |
| 9 | −208.88875 | 33.1833 | 1.0 | |
| 10 | −31.00680 | 3.2000 | 1.48874 | 58.2 |
| 11 | −35.00000 | 7.0000 | 1.43331 | 52.0 |
| 12 | ∞ | 4.0000 | 1.83274 | 52.8 |
| 13 | ∞ | 0 | 1.0 | |

FIG. 17

THIRD EMBODIMENT
ASPHERIC SURFACE COEFFICIENTS

|     | 1ST SURFACE    | 2ND SURFACE     | 4TH SURFACE     | 5TH SURFACE     |
|-----|----------------|-----------------|-----------------|-----------------|
| k   | 0              | 0               | 0               | 0               |
| A 3 | -0.7772024E-05 | 0               | 0.2430629E-04   | 0.2191169E-04   |
| A 4 | 0.8640516E-07  | -0.1801287E-05  | -0.2543892E-05  | -0.2382284E-05  |
| A 5 | -0.3976652E-06 | 0               | 0.6433131E-06   | 0.4792652E-06   |
| A 6 | 0.2658215E-07  | 0.2564686E-08   | -0.2840479E-07  | -0.1878978E-07  |
| A 7 | -0.8944643E-09 | 0               | 0.6702074E-09   | 0.2526350E-09   |
| A 8 | 0.1239778E-10  | -0.1586957E-11  | -0.7626521E-11  | -0.1710349E-12  |
| A 9 | 0              | 0               | 0               | 0               |
| A 10| -0.9366380E-15 | 0.3636785E-15   | 0.3885557E-15   | -0.3800510E-15  |

|     | 8TH SURFACE    | 9TH SURFACE     | 10TH SURFACE    | 11TH SURFACE    |
|-----|----------------|-----------------|-----------------|-----------------|
| k   | 0              | 0               | -0.1000000E+01  | -0.5000000E+00  |
| A 3 | 0              | 0               | -0.5447005E-04  | 0               |
| A 4 | -0.1162729E-05 | -0.6340201E-06  | 0.1329035E-04   | 0               |
| A 5 | 0              | 0               | -0.1441770E-05  | 0               |
| A 6 | -0.1184091E-08 | -0.1192998E-08  | 0.7065280E-07   | 0               |
| A 7 | 0              | 0               | -0.1794321E-08  | 0               |
| A 8 | 0.2289451E-12  | 0.5493192E-13   | 0.1936252E-10   | 0               |
| A 9 | 0              | 0               | 0               | 0               |
| A 10| -0.5550987E-15 | -0.3108662E-15  | -0.1077412E-14  | 0               |

FIG. 20

FOURTH EMBODIMENT
$f_0 = 78.80$ mm  F/no = 1.03  $2\omega = 70.3°$
$M = -1/12.94×$  $L = 1095.9832$ mm

| SURFACE NO. i | CURVATURE RADIUS $R_i$ | SURFACE DISTANCE $D_i$ | RERACTIVE INDEX $N_d$ | ABBE NUMBER $\nu_d$ |
|---|---|---|---|---|
| 1 | 137.36161 | 6.5000 | 1.48986 | 58.0 |
| 2 | 637.82508 | 3.9750 | 1.0 | |
| 3 | ∞ | 4.0000 | 1.0 | |
| 4 | −72.86618 | 6.2000 | 1.48986 | 58.0 |
| 5 | −85.04907 | 11.9676 | 1.0 | |
| 6 | 85.80000 | 20.7200 | 1.58913 | 61.3 |
| 7 | −158.60000 | 27.5930 | 1.0 | |
| 8 | −652.89133 | 7.8000 | 1.48928 | 57.5 |
| 9 | −116.12821 | 32.0123 | 1.0 | |
| 10 | −31.00680 | 3.2000 | 1.48874 | 58.2 |
| 11 | −35.00000 | 7.0000 | 1.43331 | 52.0 |
| 12 | ∞ | 4.0000 | 1.83274 | 52.8 |
| 13 | ∞ | 0 | 1.0 | |

FOURTH EMBODIMENT  FIG. 21

ASPHERIC SURFACE COEFFICIENTS

|      | 1$^{ST}$ SURFACE | 2$^{ND}$ SURFACE | 4$^{TH}$ SURFACE | 5$^{TH}$ SURFACE |
|------|------------------|------------------|------------------|------------------|
| k    | 0                | 0                | 0                | 0                |
| A 3  | -0.7772024E-05   | 0                | 0.2430629E-04    | 0.2191169E-04    |
| A 4  | 0.8640516E-07    | -0.1801287E-05   | -0.2543892E-05   | -0.2382284E-05   |
| A 5  | -0.3976552E-06   | 0                | 0.6433131E-06    | 0.4792652E-06    |
| A 6  | 0.2658215E-07    | 0.2564686E-08    | -0.2840479E-07   | -0.1878978E-07   |
| A 7  | -0.8944643E-09   | 0                | 0.6702074E-09    | 0.2526350E-09    |
| A 8  | 0.1239778E-10    | -0.1586957E-11   | -0.7626521E-11   | -0.1710349E-12   |
| A 9  | 0                | 0                | 0                | 0                |
| A 10 | -0.9366380E-15   | 0.3636785E-15    | 0.3885557E-15    | -0.3800510E-15   |

|      | 8$^{TH}$ SURFACE | 9$^{TH}$ SURFACE | 10$^{TH}$ SURFACE | 11$^{TH}$ SURFACE |
|------|------------------|------------------|-------------------|-------------------|
| k    | 0.1810509E+02    | 0.3750799E+00    | -0.1000000E+01    | -0.5000000E+00    |
| A 3  | 0.6901456E-03    | 0.8758392E-03    | -0.5447005E-04    | 0                 |
| A 4  | -0.1290188E-03   | -0.1634363E-03   | 0.1329035E-04     | 0                 |
| A 5  | 0.1360875E-04    | 0.1704547E-04    | -0.1441770E-05    | 0                 |
| A 6  | -0.8905000E-06   | -0.1084274E-05   | 0.7065280E-07     | 0                 |
| A 7  | 0.3633021E-07    | 0.4271222E-07    | -0.1794321E-08    | 0                 |
| A 8  | -0.9043145E-09   | -0.1021628E-08   | 0.1936252E-10     | 0                 |
| A 9  | 0.1255465E-10    | 0.1357768E-10    | 0                 | 0                 |
| A 10 | -0.7503633E-13   | -0.7725470E-13   | -0.1077412E-14    | 0                 |

PROJECTION LENS

CROSS-REFERENCE TO RELATED APPLICATION

This application claims, under 35 USC 119, priority of Japanese Application No. 2004-23858 filed Jan. 30, 2004.

BACKGROUND OF THE INVENTION

The present invention relates to a projection lens, and in particular, relates to a projection lens suitable to be applied in a projection television, etc.

There is already known so-called a projection television apparatus, in which an image displayed on a fluorescent screen of a CRT projection tube is magnified and projected upon a screen through a projection lens. The performances required for such the projection lens increase up every year, which determine the picture quality of the projection television apparatus. Under such situation, there is described an invention for improving the performances of image formation of the projection lens, for example, in the following Patent Document 1.

With the conventional technology discloses in the Patent Document 1, there is already know a projection lens of a hybrid method (combining a glass lens and a resin lens therein) within the projection lens constituted by five lens units or groups, wherein a third lens unit is made of a glass material having any value within a range from 50 to 75 of Abbe number, while a first lens unit and a fourth lens unit are made of a resin or plastic material have any number within a range from 20 to 35 of Abbe number and also a second lens unit and a plastic lens within a fifth lens unit have any number within a range from 50 to 60 of Abbe number, thereby achieving the high performances of image formation.

Herein, a faceplate of the CRT projection tube, being a constituent element of the fifth lens group, has a spherical surface of 350 mm of the curvature radius in the configuration of the fluorescent screen, thickness of 14.1 mm at an optical axis, and refractive index of 1.562 in the material thereof.

On the other hand, various efforts were also made for increasing up an original picture itself in quality thereof, which is displayed on the CRT projection tube; such as, adopting a crystalline transparent glass material into the faceplate, for example, thereby developing a CRT projection tube of achieving high resolution (8 Lp/mm), high brightness, and a long lifetime.

The spherical surface of the CRT projection tube having such high resolution is flat on the surface thereof, and further the faceplate thereof is very thin in the thickness. Also, the material thereof has high refractive index, such as, from 1.715 to 1.833; therefore, it is impossible to deal with such tube with only applying the ideas, which are adopted into and extended from such the conventional projection lens.

Patent Document 1: Japanese Patent Laying-Open 2000-81569 (2000).

SUMMARY OF THE INVENTION

Then, by taking such background as was mentioned above into the consideration, an object according to the present invention is to provide a projection lens, enabling to bring out the performances or capacities of the CRT projection tube of high resolution, fully, thereby obtaining a large angle of field while keeping the F number (F/no) bright, as well as, achieving a low cost but without increasing the number of lens units thereof.

For obtaining a projection lens, having a large angle of field and being superior in the image forming capacity, while keeping the F number (F/no) bright, according to the present invention, there is provided a projection lens, for enlarging and projecting a picture formed on a flat fluorescent plate of a CRT projection tube, comprising: a first lens unit of a plus lens, having aspheric surfaces on both surfaces thereof, being convex to the screen side at a central portion including an optical axis thereof; a second lens unit of a minus lens, having aspheric surfaces on both surfaces thereof, being concave to the screen side at a central portion including an optical axis thereof; a third lens unit of a plus lens, having spherical surfaces on both surfaces thereof, being convex on both sides; a fourth lens unit of a plus lens, having aspheric surfaces on both surfaces thereof, being curved in concave-like to the screen side, on a peripheral portion far from the optical axis into a radial direction thereof; and a fifth lens unit of a minus lens, being made up with a transparent liquid, commonly serving a faceplate of said CRT projection tube and a cooling, and a meniscus lens, having a thickness being nearly equal to and at least an aspheric surface directing a concave surface thereof to the screen side, being disposed successively from a screen side to said CRT projection tube, wherein the following conditions (1) to (5) are satisfied:

(1) $0.1 < f_0/f_1 < 0.3$;
(2) $-0.15 < f_0/f_2 < -0.01$;
(3) $0.7 < f_0/f_3 < 0.9$;
(4) $0.15 < f_0/f_4 < 0.35$;
(5) $-1.3 < f_0/f_5 < -0.9$;

where, $f_0$ is a focal distance of a total system; $f_1$ is a focal distance of said first lens unit; $f_2$ is a focal distance of said second lens unit; $f_3$ is a focal distance of said third lens unit; $f_4$ is a focal distance of said fourth lens unit; and $f_5$ is a focal distance of said fifth lens unit.

Within the projection lens according to the present invention, a plus refractive power can be obtained by means of the third lens unit made from a glass, as well as, the first lens unit and the fourth lens unit, both of which are made from a resin, and also that first lens unit compensates distortion aberration together with the fifth lens unit.

Further, the fifth lens unit is a minus lens directing the concave surface thereof to the screen side, and it has an aspheric surface at least on one (1) surface thereof, thereby to compensate the curvature of field, as well as, compensating the astigmatism, and the distortion aberration.

Also, the second lens unit made of a resin has very important functions, i.e., compensating almost of the aberrations, such as, the spherical aberration, the coma aberration, the astigmatism and the distortion aberration, for example, and it also compensates the curvature of field together with the fifth lens unit.

Furthermore, the fourth lens compensates mainly the coma aberration on the marginal image height; i.e., it compensates the astigmatism, which cannot be compensated by means of the fifth lens unit.

Also, the condition (1) for achieving the object of the projection lens according to the present invention relates to the refractive power of the first lens unit; i.e., if it falls down exceeding the lower limit, then it is necessary to strengthen the refractive power of the third lens unit and the fourth lens unit, thereby increasing the spherical aberration; therefore, it results into an obstacle to obtain bright F number (F/no). On the other hand, if it does up exceeding the upper limit, the aberration on an outside of the axis is deteriorated, thereby resulting into an obstacle to achieve a wide angle of field.

The condition (2) relates to the refractive power of the second lens unit; i.e., if it falls down exceeding the lower limit, then it is necessary to increase the thickness of the first lens unit, so as to strengthen the refractive power thereof. Then, it is necessary to take a long time for forming the first lens unit, which is made of a resin, in the manufacturing process thereof, and therefore it results into a high const thereof. On the other hand, if exceeding the upper limit, it brings about deterioration of the temperature characteristics of MTF.

The condition (3) relates to the refractive power of the third lens unit; i.e., if it falls down exceeding the lower limit, then it is necessary to increase the thickness of the fourth lens unit, so as to strengthen the refractive power thereof. For increasing the thickness of the fourth lens unit, which is made of a resin, it is necessary to take a long time for forming the lens in the manufacturing process thereof, and therefore it results into a high const thereof. On the other hand, if exceeding the upper limit, it increases the spherical aberration, and therefore bringing about an obstacle to obtain the bright F number (F/no).

The condition (4) relates to the refractive power of the fourth lens unit; i.e., if it falls down exceeding the lower limit, then it is difficult to compensate the coma aberration, and at the same time it is also necessary to increase the refractive powers of the first lens unit and the third lens unit; therefore, it is difficult to compensate the spherical aberration. It also brings the thickness of the lens to be large, thereby resulting into an obstacle to obtain the bright F number (F/no) and a low manufacturing cost. On the other hand, if exceeding the upper limit, it is difficult to compensate the coma aberration and the astigmatism, and also the distortion aberration is increased; therefore, it is difficult to obtain the wide angle of field.

The condition (5) relates to the refractive power of the fifth lens unit, in other words, the condition for keeping the curvature of filed to be preferable; i.e., if it falls down exceeding the lower limit, then the compensation upon the curvature field is too much, on the other hand if it exceeds the upper limit, the compensation upon the curvature field is in short.

Also, due to the provision of the stop between the first lens unit and the second lens unit, the effective diameters of the first lens unit and the second lens unit, which are disposed in the vicinity of the stop in front and rear thereof, will not become larger than necessary; therefore, it is possible to manufacture the lenses with a low cost.

BRIEF DESCRIPTION OF THE DRAWING

Those and other objects, features and advantages of the present invention will become more readily apparent from the following detailed description when taken in conjunction with the accompanying drawings wherein:

FIG. 3 is a table for showing radius of curvature, refractive index, etc., upon surface of each lens unit building up the projection lens, according to the first embodiment of the present invention;

FIG. 4 is a table for showing coefficients, each for defining an aspheric surface on the each lens unit building up the projection lens, according to the first embodiment of the present invention;

FIG. 11 is a table for showing radius of curvature, refractive index, etc., upon surface of each lens unit building up the projection lens, according to the second embodiment of the present invention;

FIG. 12 is a table for showing coefficients, each for defining an aspheric surface on the each lens unit building up the projection lens, according to the second embodiment of the present invention;

FIG. 16 is a table for showing radius of curvature, refractive index, etc., upon surface of each lens unit building up the projection lens, according to the third embodiment of the present invention;

FIG. 17 is a table for showing coefficients, each for defining an aspheric surface on the each lens unit building up the projection lens, according to the third embodiment of the present invention;

FIG. 20 is a table for showing radius of curvature, refractive index, etc., upon surface of each lens unit building up the projection lens, according to the fourth embodiment of the present invention;

FIG. 21 is a table for showing coefficients, each for defining an aspheric surface on the each lens unit building up the projection lens, according to the fourth embodiment of the present invention;

DETAILED DESCRIPTION OF THE INVENTION

Hereinafter, embodiments according to the present invention will be fully explained by referring to the attached drawings.

<A> First Embodiment

Figure 1:
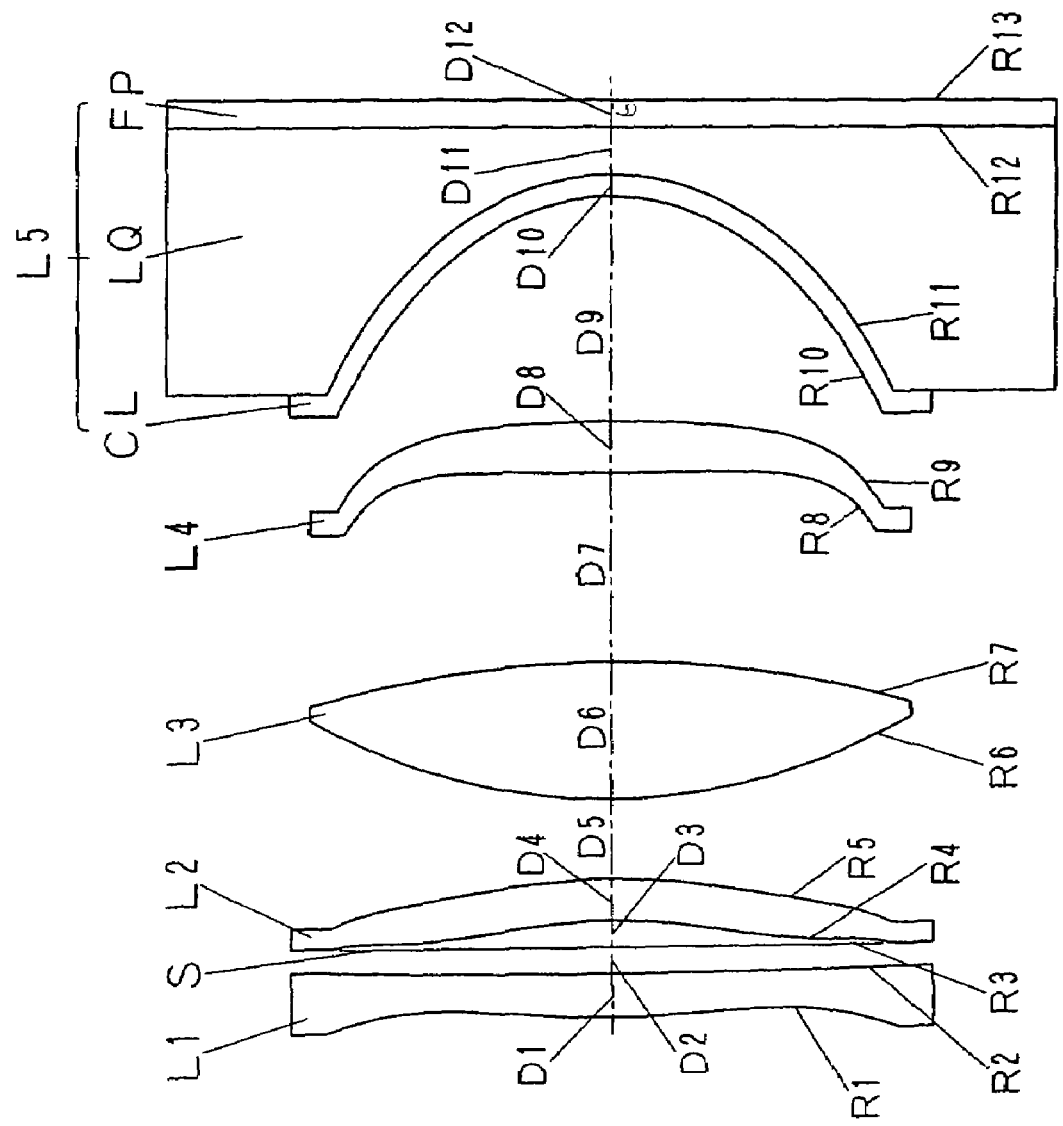
FIG. 1 is a view for explaining the lens configurations of a projection lens, according to the present invention.

FIG. 1 shows an arrangement of lens units within the projection lens according to the present invention. However, this FIG. 1 shows surface configurations, thicknesses at the optical axis of the respective lens units, and also distances between the lens units neighboring with each other, in an image-like manner, clearly.

In this FIG. 1, it is assumed that a curvature radius is "Ri" on an optical axis on the $i^{th}$ surface counting up from a screen side (R1–R13), and that a distance is "Di" at the optical axis between the $i^{th}$ surface and the $i+1^{th}$ surface (D1–D12).

Figure 2:
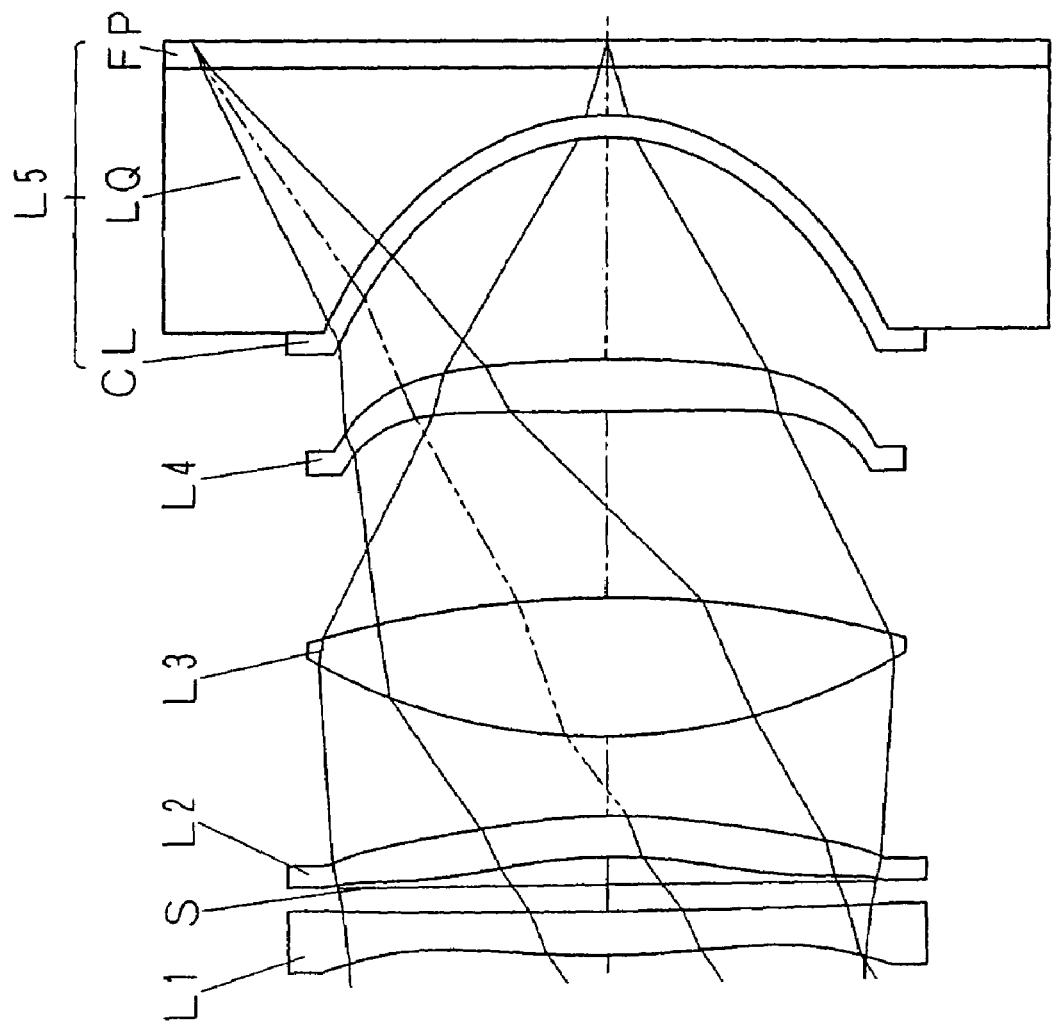
FIG. 2 is a view for showing the lens configurations of the projection lens, according to a first embodiment of the present invention, tracing light beams therein.

FIG. 2 shows the lens configuration of the projection lens according to the present embodiment, while tracing the light beams when applying numerical values therein in more details thereof.

In this FIG. 2, the projection lens comprises a first lens unit L1, a second lens unit L2, a third lens unit L3, a fourth lens unit L4 and a fifth lend unit L5. Also, the projection lens further comprises an iris or stop "S", which is provided between the first lens unit L1 and the second lens unit L2.

FIG. 3 is a table showing the concrete values of curvature radiuses R1–R13 at the optical axis on the $1^{st}$ to $13^{th}$ surfaces of the lens units, the distances D1–D13 between the surfaces of neighboring lens units, the refractive indexes Nd1–Nd13 upon the surfaces of the respective lens units (refractive index at "d" line), and the Abbe numbers vd1–vd13 of the respective lens units (Abbe numbers at "d" line). Herein, the refractive index Ndi and the Abbe number vdi are described on a line, corresponding to the $i^{th}$ line counting up from the screen side. Also, herein the above are described under the condition that a focal distance of a total system is "$f_0$" (focal distance at "e" line), brightness "F/no", an angle of field "2ω", lateral magnification "M" and a projection distance "L", respectively.

Further, FIG. 4 is a table showing the values of conical constant "k" and aspheric coefficients A3–A10, for defining the configurations of the $1^{st}$ surface, the $2^{nd}$ surface, the $4^{th}$ surface, the $5^{th}$ surface, the $8^{th}$ surface, the $9^{th}$ surface, the $10^{th}$ surface and the $11^{th}$ surface, each having an aspheric surface.

Herein, the conical constant "k" and the aspheric coefficient A3–A10 for defining the aspheric configurations are parameters, each being put into the following equation (1) for identifying the aspheric configuration. Namely, as is well known in the art, the surface configuration of an aspheric surface can be expressed by the following equation (1) within the orthogonal coordinate system (X, Y, Z) having Z axis along with the optical axis, where "R" is the paraxial curvature radius, "k" the conical constant, and A3–A10 the aspheric coefficients from the $3^{rd}$ surface to the $10^{th}$ surface, respectively:

$$Z(h) = (h^2/R) / \left[1 + \{1-(1+k)\times(h^2/R)\}^{1/2}\right] + \\ A3\times h^3 + A4\times h^4 + A5\times h^5 + A6\times h^6 + \\ A7\times h^7 + A8\times h^8 + A9\times h^9 + A10\times h^{10} \quad (1)$$

By referring to FIG. 2, explanation will be made about the lens configuration of the projection lens according to the present embodiment.

The first lens unit L1 is made from a single lens in this first embodiment. The first lens unit L1 is a plus lens having aspheric surfaces on both side surfaces thereof, being projected convex-like to the screen side in the shape thereof, at a central portion thereof including the optical axis. And, the focal distance "$f_1$" of the first lens unit is $f_1$=355.255 mm, and a ratio $f_0/f_1$ to the total focal distance $f_0$=78.00 mm is $f_0/f_1$=0.220.

The second lens unit L2 is also made from a single lens in this first embodiment. The second lens unit L2 is a minus lens having aspheric surfaces on both side surfaces thereof, being recessed concave-like to the screen side in the shape thereof, at a central portion thereof including the optical axis. And, the focal distance "$f_2$" of the second lens unit is $f_2$=−1,263.904 mm, and a ratio $f_0/f_2$ to the total focal distance $f_0$=78.00 mm is $f_0/f_2$=−0.062.

Also, the third lens unit L3 is made from a single lens in this first embodiment. But, the third lens unit L3 is a plus lens having spherical surfaces on both side surfaces thereof, being projected convex-like to the screen side in the shape thereof. The focal distance "$f_3$" of the second lens unit is $f_3$=97.172 mm, and a ratio $f_0/f_3$ to the total focal distance $f_0$=78.00 mm is $f_0/f_3$=0.803.

Further, the fourth lens unit L4 is also made from a single lens in this first embodiment. The second lens unit L4 is a plus lens having aspheric surfaces on both side surfaces thereof, being curved concave-like to the screen side in the shape thereof, but on a peripheral portion far from the optical axis in the radial direction thereof. And, the focal distance "$f_4$" of the fourth lens unit is $f_4$=321.541 mm, and a ratio $f_0/f_4$ to the total focal distance $f_0$=78.00 mm is $f_0/f_4$=0.243.

The fifth lens unit L5 is a minus lens, being made up with a faceplate FP of a plat CRT, a transparent liquid LQ for also cooling down the CRT, simultaneously, and further a meniscus lens CL having aspheric surfaces on both side surfaces, directing the concave surface to the screen side, as well as, having nearly uniform thickness thereof. The focal distance "$f_5$" of the fifth lens unit is $f_5$=−71.111 mm, and a ratio $f_0/f_5$ to the total focal distance $f_0$=78.00 mm is $f_0/f_4$=−1.097. Also, the fifth lens unit L5 is made up with bringing the faceplate FP, the transparent liquid LQ and the meniscus lens CL to be closely contact with one another, and the transparent liquid LQ is filled up within a space defined between the faceplate FP and the meniscus lens CL. Further, the faceplate FP is a surface glass of the flat CRT projection tube in a front side thereof, and it is made of a crystalline transparent glass. Pictures are formed upon a surface R13 of the CRT.

Between the first lens unit L1 and the second lens unit L2 is provided an iris or stop "S", which has a diameter φ79.34 mm. The maximum effective diameter of the first lens unit L1 lies on the side of the surface R1, and the value thereof is φ79.04 mm, while the maximum effective diameter of the second lens unit L2 lying on the side of the surface R5 is ϕ80.74 mm; therefore, the effective diameter will not become large.

The projection lens, according to the present embodiment, is constructed so that the best image formation can be obtained when a picture of 4.8 inches in a raster size (the maximum image height is 60.95 mm) on a fluorescent plate (the surface R13) of the flat CRT projection tube is enlarged and projected upon the screen to be a picture of 51 inches.

Next, explanation will be made about a reason of brining the ratios between the respective focal distances $f_1$–$f_5$ of the respective lens units L1 to L5 and the focal distance $f_0$ of the total system into such the conditions as were mentioned above, within the projection lens according to the first embodiment.

In this projection lens according to the first embodiment, a positive or plus refractive power is obtained through the third lens unit L3 made of glass and the first lens unit L1 and the fourth lens unit L4, both of which are made of resin, and also the first lens unit L1 has a function of compensating aberrations due to the curvature together with the fifth lens unit L5.

Also, the fifth lens unit L5 is a minus lens directing the concave surface to the screen side, and at least one surface thereof is in aspheric, so as to compensate an aspheric aberration and a curvature aberration, and also to compensate the curvature of field, as well.

Further, the second lens unit L2, which is made of resin, has an important function of compensating almost of all aberrations, such as, the spherical aberration, the coma aberration, the aspheric aberration, and the curvature aberration, etc., for example, and further has a function of compensating the curvature of field together with the fifth lens unit L5.

Moreover, the fourth lens unit L4 mainly compensates the coma aberration of the marginal image height around the periphery thereof; i.e., it has a function of compensating the aspheric aberration, which cannot be corrected by means of the fifth lens unit L5.

The reason of setting the ratio of the first lens unit L1 at $f_0/f_1$=0.220, by taking the functions of those lens units L1–L5 mentioned above into the consideration, lies in that if setting the $f_0/f_1$ to be small in relation to the refractive power of the first lens unit, the refractive powers of the third lens unit L3 and the fourth lens unit L4 must be strong, thereby, increasing the spherical aberration; therefore it comes to be an obstacle to obtain a bright F/no. On the other hand, if setting the $f_0/f_1$ to be large, the aberrations in an outside of the axis are deteriorated or degraded, it also comes to be an obstacle to obtain a wide angle of field.

Also, the reason of setting the ratio of the second lens unit L2 at $f_0/f_2$=−0.062 lies in that, if setting the $f_0/f_2$ to be small in relation to the refractive power of the second lens unit, it is necessary to make the thickness of the first lens unit L1 large, so as to strengthen the refractive power thereof. Therefore, it takes a long time for forming such first lens unit that is made of resin, in particular, in manufacturing process thereof, and it results into an increase of cost. While, if setting the $f_0/f_2$ to be large, the temperature characteristics of MTF is deteriorated.

And also, the reason of setting the ratio of the third lens unit L3 at $f_0/f_3$=0.803 lies in that, if setting the $f_0/f_3$ to be small in relation to the refractive power of the third lens unit, it is necessary to make the thickness large of the fourth lens unit L4 made of resin, so as to strengthen the refractive power thereof; i.e., taking a long time for forming it in manufacturing process thereof. On the other hand, if setting $f_0/f_3$ to be large, then the aspheric aberrations increase, to be an obstacle to obtain a bright F/no.

Further, the reason of setting the ratio of the fourth lens unit L4 at $f_0/f_4$=0.243 lies in that, if setting the $f_0/f_4$ to be small in relation to the refractive power of the fourth lens unit, compensation of the coma aberration is difficult, and it is also necessary to increase the refractive powers of the first lens unit and the third lens unit. Thus, it is difficult to compensate the spherical aberration, and the large thickness of the lens comes to be an obstacle to achieve the bright F/no and a low manufacturing cost thereof. Also, if setting the $f_0/f_4$ to be large, it is difficult to make compensation upon the coma aberration and/or the astigmatism thereof, and it is also difficult to obtain a wide angle of field, due to an increase of a distortion aberration.

Furthermore, the reason of setting the ratio of the fifth lens unit L5 at $f_0/f_5$=−1.097 lies in the purpose of keeping the curvature of filed to be preferable. Thus, if setting the $f_0/f_5$ small, the compensation upon the curvature of filed is too much, while if setting the $f_0/f_5$ large, the compensation upon the curvature of filed is in short.

As is shown in FIG. 3, the projection lens according to the first embodiment has the total focal distance $f_0$=78.00, the brightness F/no=1.03, the angle of field 2ω=69.5°, the lateral magnification M=−1/10.63×, and the projection distance (the distance between the screen and the first lens unit L1) L=914.1596 mm, respectively, in the application thereof.

As is shown in FIG. 3, the faceplate FP building up the fifth lens unit L5 of the projection lens according to the first embodiment is made up by applying a material having the refraction index Nd12=1.71506, the Abbe number vd12=62.6, and the thickness thereof D12=4.000 mm.

Figure 5:
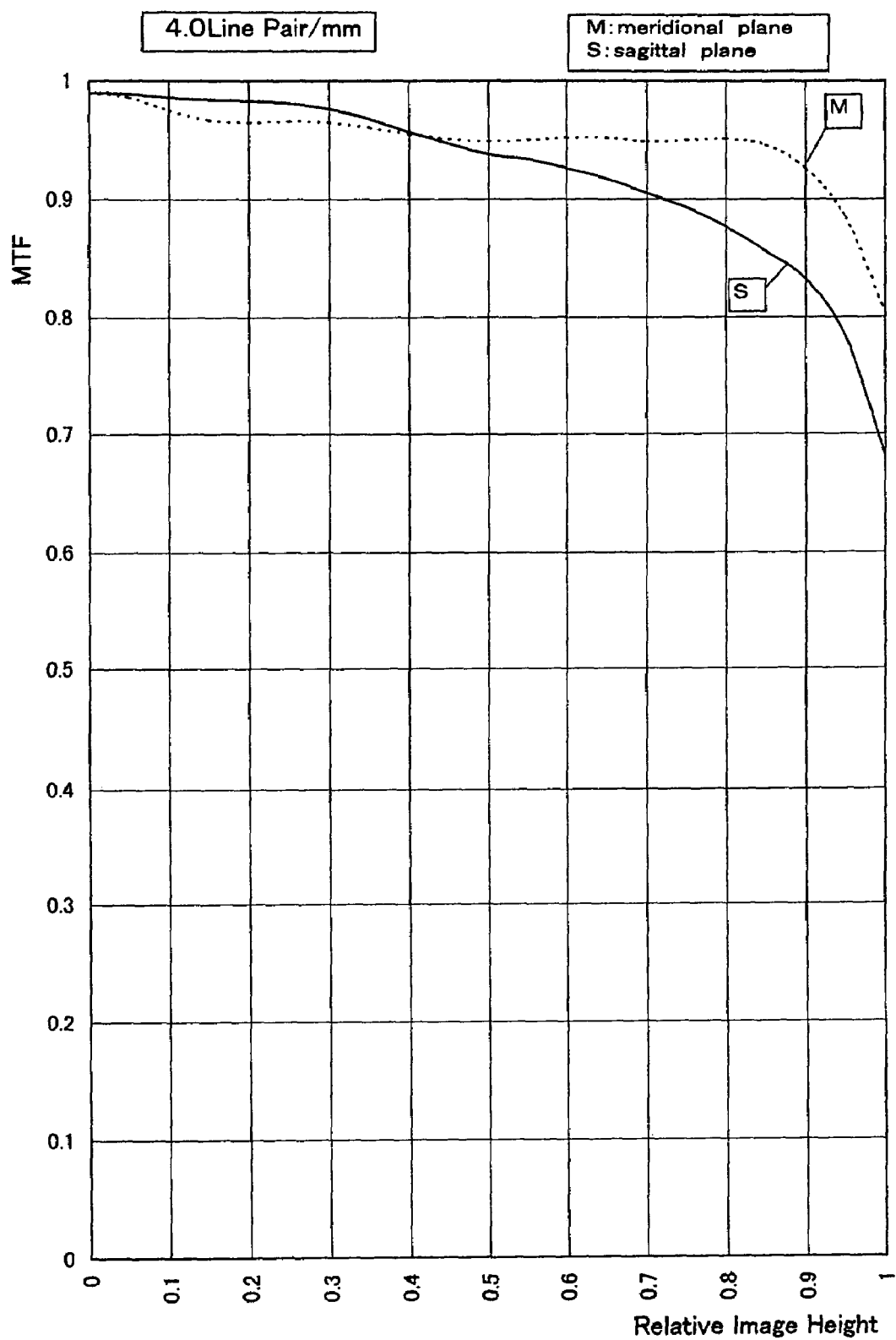
FIG. 5 is a graph for showing a MTF-relative image height characteristic curve of the projection lens, according to the first embodiment of the invention, at resolution of 4 Lp/mm.

FIG. 5 is a graph for showing the MTF (Modulation Transfer Function) characteristic within the projection lens according to the first embodiment. This FIG. 5 shows the MTF to an image height 0.0–1.0 on a meridional plane and a sugittal plane with respect to a monochromatic 0.4 line pair per 1 mm (4.0 Lp/mm).

Figure 6:
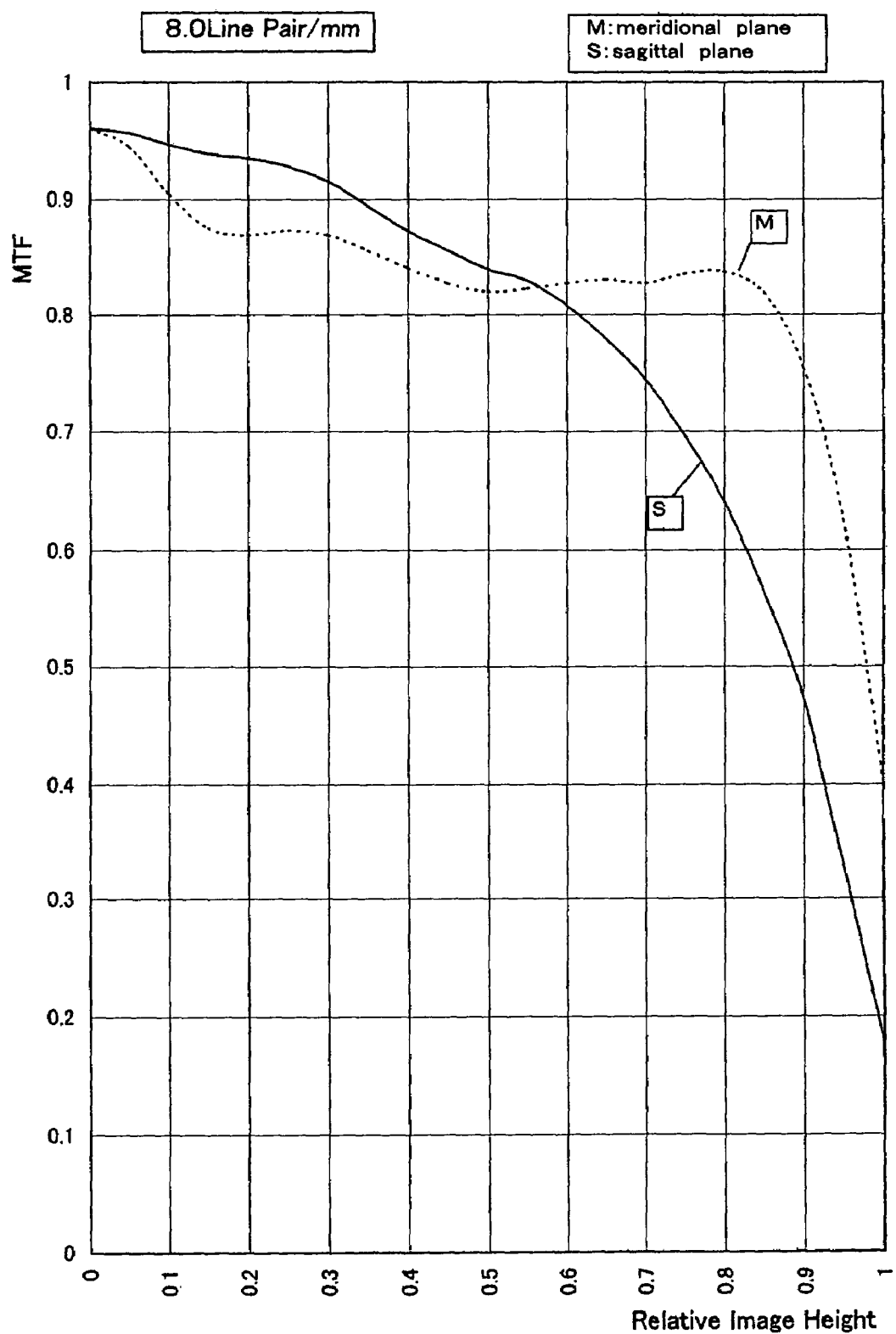
FIG. 6 is a graph for showing the MTF-relative image height characteristic curve of the projection lens, according to the first embodiment of the invention, at resolution of 8 Lp/mm.

FIG. 6 is also a graph for showing the MTF (Modulation Transfer Function) characteristic within the projection lens according to the first embodiment. This FIG. 6 shows the MTF to the image height 0.0–1.0 on the meridional plane and the sugittal plane, but with respect to a 0.8 pair line per 1 mm (8.0 Lp/mm).

The vertical axis in FIGS. 5 and 6 is indicated by a relative image height, assuming that the maximum image height is one (1). In this connection, the 4.0 Lp/mm corresponds to about 600 TV pieces, while the 8.0. Lp/mm to about 1,200 TV pieces, about the number of pieces of CRT scanning lines (a TV screen of 4:3). Further, a color weight when calculating the MTF is set to one (1) with respect to the "e" line (546 nm).

Figure 7:
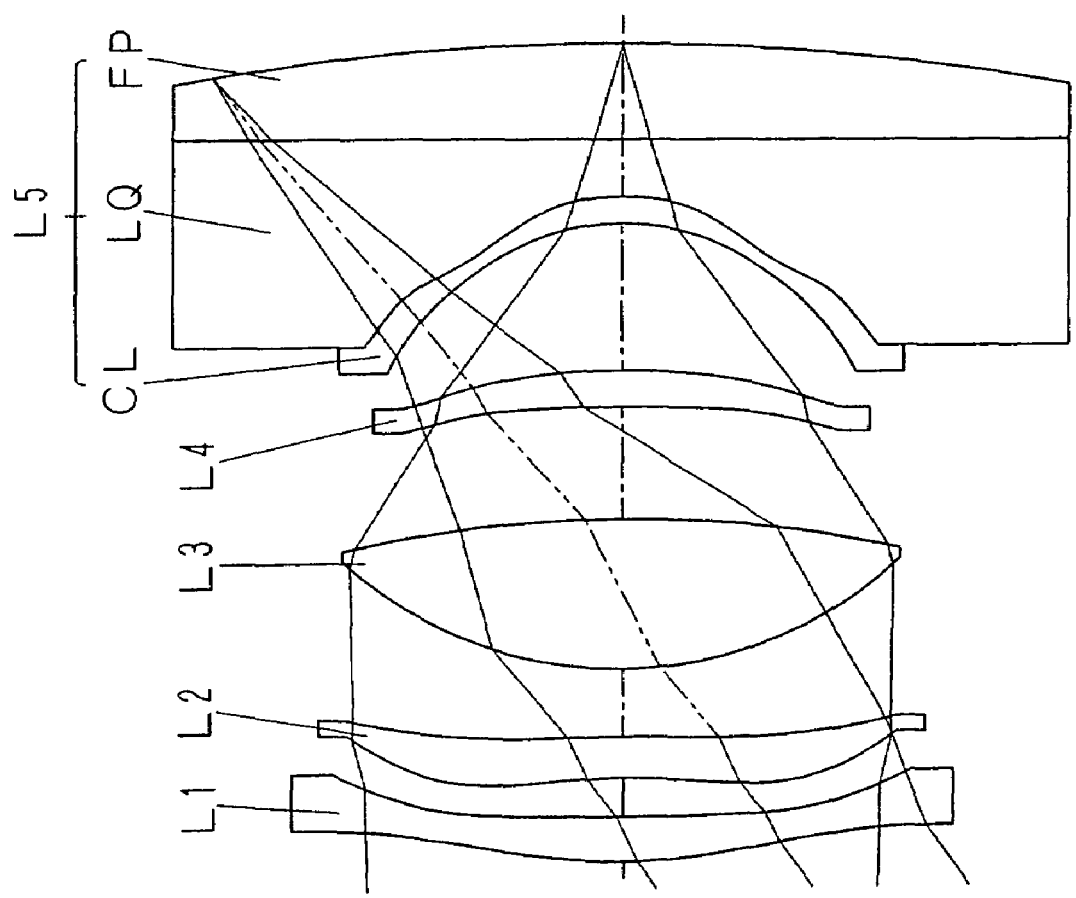
FIG. 7 is a view for showing the lens configurations of the projection lens, in relation to the conventional art, tracing light beams therein.
Figure 8:
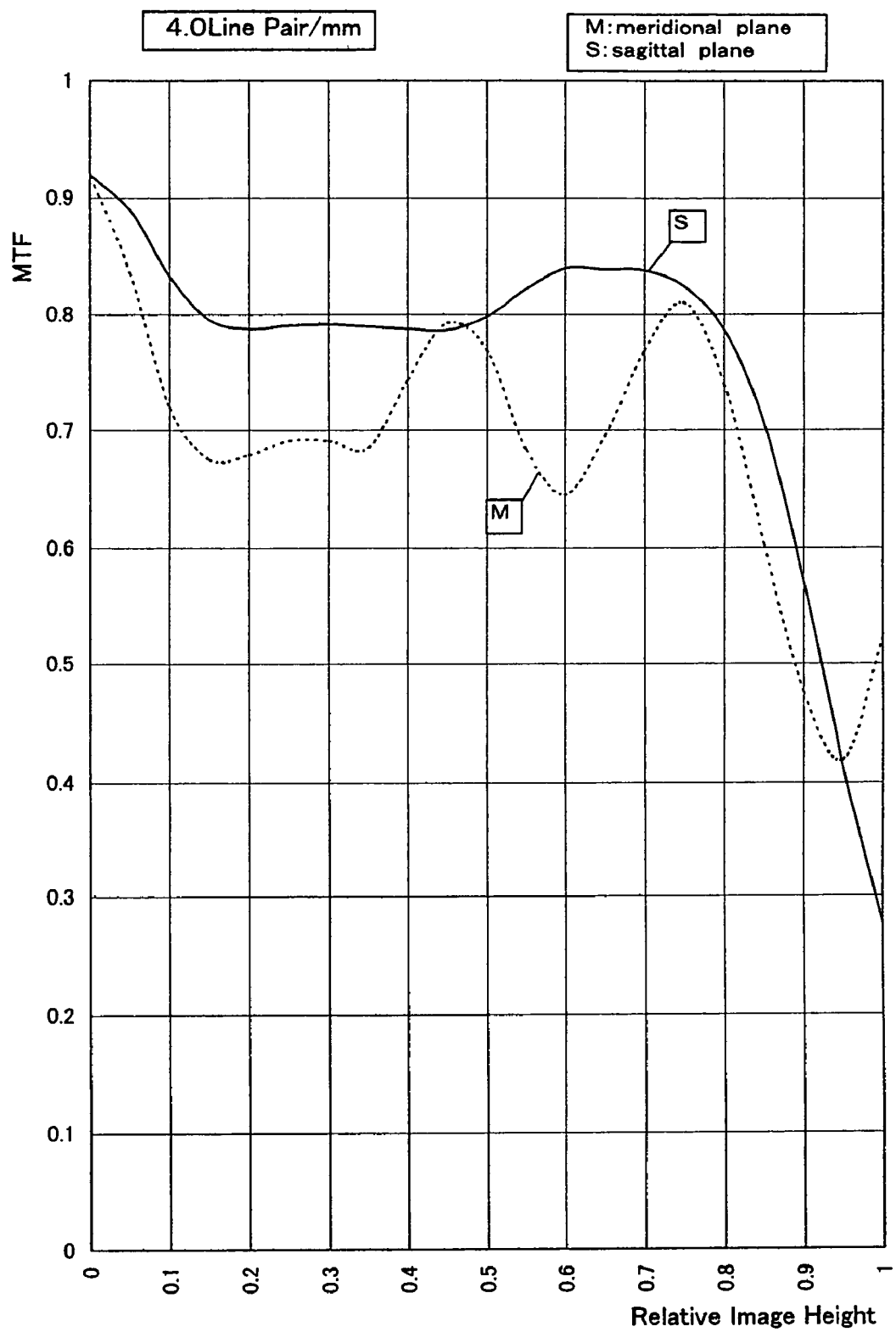
FIG. 8 is a graph for showing the MTF-relative image height characteristic curve of the projection lens of the conventional art, at resolution of 4 Lp/mm.
Figure 9:
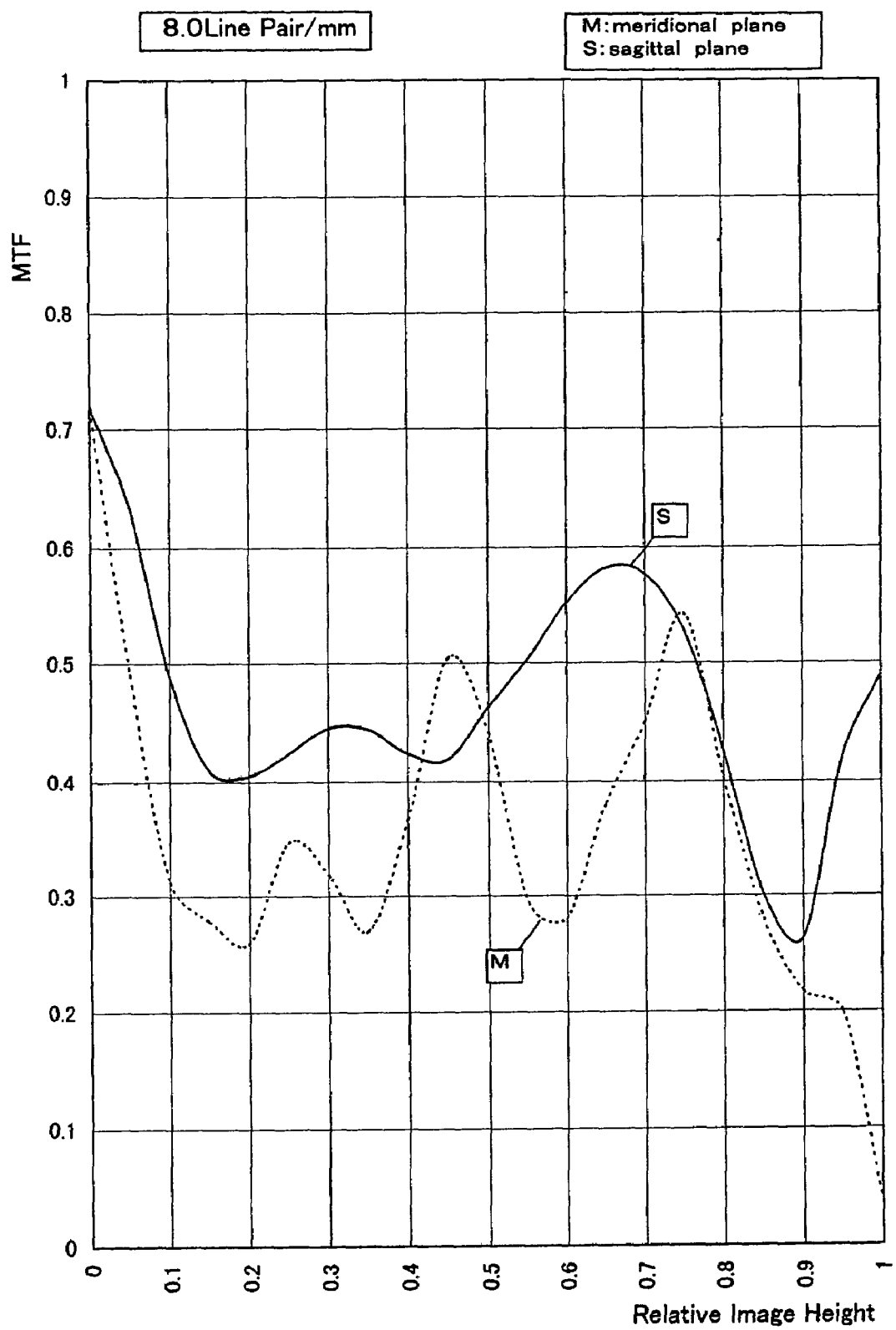
FIG. 9 is a graph for showing the MTF-relative image height characteristic curve of the projection lens of the conventional art, at resolution of 8 Lp/mm.

FIG. 7 is a view for showing the projection lens of five (5) pieces of lens units, relating to the conventional art (i.e., a comparison example to the first embodiment), and FIGS. 8 and 9 show the MTF characteristics within the projection lens relating to that conventional art.

From FIG. 5, i.e., the MTF characteristic of the projection lens according to the first embodiment obtained at 4.0 Lp/mm, the resolution is high all over the region of the image height, upon both the meridional plane and the sugittal plane, and in particular, the image height is about 0.8 at the lowest, within the region from 0.0 to 0.9 of the image height, upon both the meridional plane and the sugittal plane. With this, it is apparent that the resolution of the projection lens according to the first embodiment is preferable, even if comparing it to the MTF characteristic of the conventional lens shown in FIG. 8, and also that various kinds of the aberrations be preferably compensated.

Also, from FIG. 6, i.e., the MTF characteristic of the projection lens according to the first embodiment at 8.0 Lp/mm, the image height is 0.4 at the lowest all over the region of the image height upon the meridional plane, while it is also about 0.4 at the lowest within the regain from 0.0 to 0.9 of the image height upon the sugittal plane. With this, it is apparent that the resolution of the projection lens according to the first embodiment is preferable, even if comparing it to the MTF characteristic of the conventional lens shown in FIG. 9, and also that various kinds of aberrations be preferably compensated.

Within the projection lens according to the present embodiment, an optical distortion is −4.0%, and a marginal light amount ratio 31.0% (=light amount at the maximum image height/light amount on the axis).

Also, as is described in the second embodiment of the Patent Document 1 (Japanese Patent Laying-Open 2000-81569 (2000)), the focal distance "$f_0$" of the conventional projection lens is 75.82 mm, and the brightness F/no 1.0, and the marginal light amount ratio 31.1%.

Namely, the basis or fundamental optical characteristics of the projection lens according to the present embodiment are similar to those of the conventional projection lens.

As was mentioned above, with the projection lens according to the first embodiment, it is possible to achieve a low cost projection lens of being large in the angle of field and being superior in capacity of the image formation, while keeping the F/no bright.

<B> Second Embodiment

Next, explanation will be given about a projection lens according to the second embodiment of the present invention, by referring to drawings attached herewith.

Figure 10:
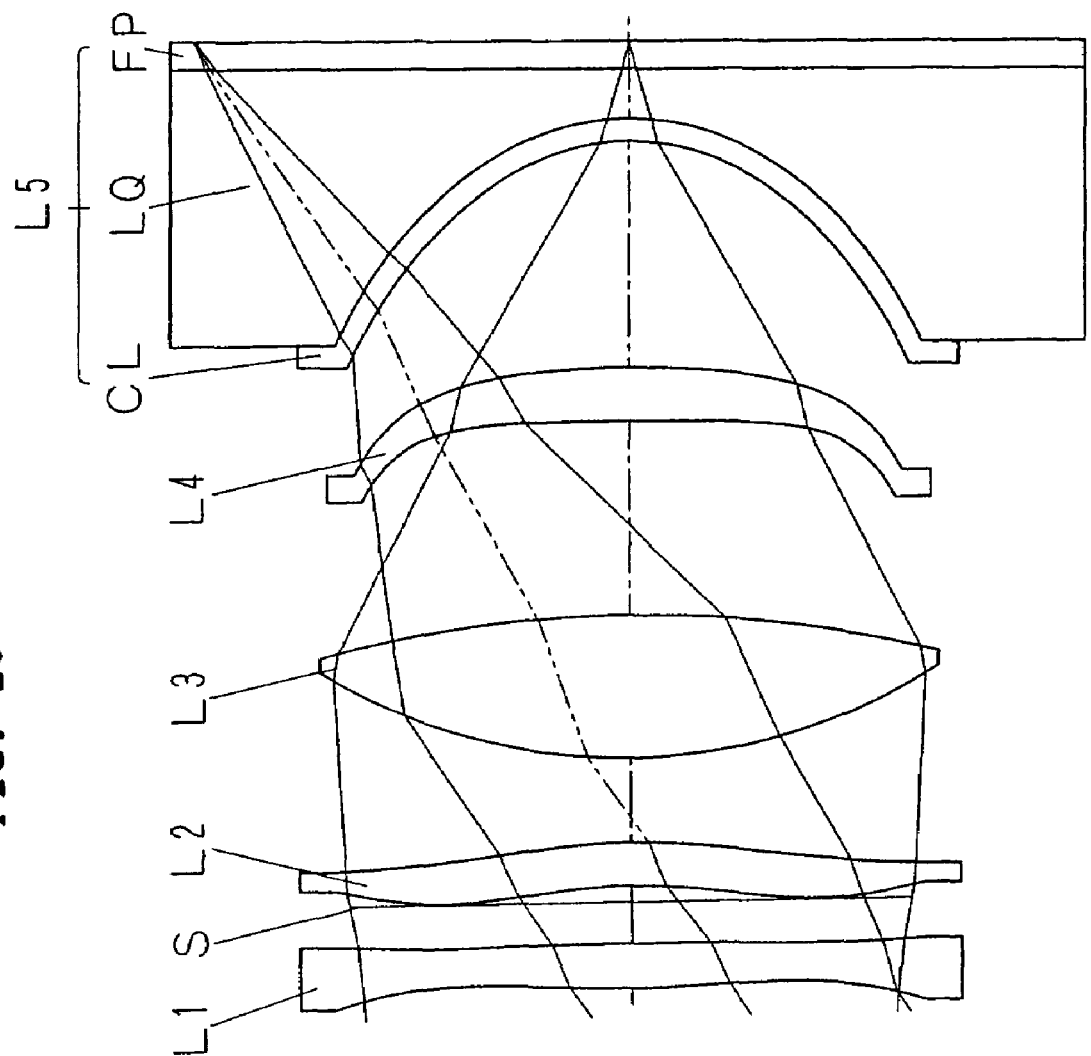
FIG. 10 is a view for showing the lens configurations of the projection lens, according to a second embodiment of the present invention, tracing light beams therein.

FIG. 10 is a view for showing the lens configuration of the projection lens according to the second embodiment, as well as, tracing light beams while applying concrete numerical values therein. In this FIG. 10, the same or similar parts or elements, which are explained corresponding to those in the first embodiment mentioned above, are shown with attaching the same references thereto.

The second embodiment, although having the refractive indexes same to those upon each of those surfaces 1–13 of the respective lens units in the first embodiment, however it is applied into the projection lens, in which changes are made upon the curvature radiuses R1–R10 of the $1^{st}$ surface to the $10^{th}$ surface at the optical axis and the distances between the respective lens units L1–L5.

FIG. 11 is a table for showing the concrete values of the curvature radiuses R1–R13, the surface distances D1–D12, the refractive indexes Nd1–Nd13 (refractive index at "d" line) and Abbe numbers vd1–vd12 (Abbe number at "d" line) on the $1^{st}$ surface to the $13^{th}$ surface at the optical axis thereof, in the projection lens according to the second embodiment.

Further, FIG. 12 is a table for showing the values of conical constant "k" and aspheric coefficients A3–A10, for defining the configurations of the $1^{st}$ surface, the $2^{nd}$ surface, the $4^{th}$ surface, the $5^{th}$ surface, the $8^{th}$ surface, the $9^{th}$ surface, the $10^{th}$ surface and the $11^{th}$ surface, each having an aspheric surface.

As is shown in FIG. 10, the projection lens according to the second embodiment is also constructed with the first lens unit L1, the second lens unit L2, the third lens unit L3, the fourth lens unit L4 and the fifth lens unit L5, each being disposed successively from the screen side, and the stop "S" provided between the first lens unit L1 and the second lens unit L2, wherein each of the functions of the lens units L1–L5 is same to that in the first embodiment.

The first lens unit L1 is made from a single lens in this second embodiment. The first lens unit L1 has a focal distance "$f_1$", $f_1$=346.306 mm, and a ratio $f_0/f_1$ to the total focal distance $f_0$=78.00 mm is $f_0/f_1$=0.225.

The second lens unit L2 is also made from a single lens in this second embodiment. The second lens unit L2 has a focal distance "$f_2$", $f_2$=−1131.790 mm, and a ratio $f_0/f_2$ to the total focal distance $f_0$=78.00 mm is $f_0/f_2$=−0.069.

The third lens unit L3 is also made from a single lens in this second embodiment. The third lens unit L3 has a focal distance "$f_3$", $f_3$=96.994 mm, and a ratio $f_0/f_3$ to the total focal distance $f_0$=78.00 mm is $f_0/f_3$=0.804.

Further, the fourth lens unit L4 is also made from a single lens in this second embodiment. The fourth lens unit L4 has a focal distance "$f_4$", $f_4$=305.080 mm, and a ratio $f_0/f_4$ to the total focal distance $f_0$=78.00 mm is $f_0/f_4$=0.256.

The fifth lens unit L5 has a focal distance "$f_5$", $f_5$=−68.495 mm, and a ratio $f_0/f_5$ to the total focal distance $f_0$=78.00 mm is $f_0/f_5$=−1.139.

However, the condition of the ratio between the focal distance of each of the lens units L1–L5 and also the focal distance of the total system are determined in accordance with the same reasons, which were explained in the first embodiment.

Between the first lens unit L1 and the second lens unit L2 is provided an iris or stop "S", which has a diameter φ80.00 mm. The maximum effective diameter of the first lens unit L1 lies on the side of the surface R1, and the value thereof is φ79.20 mm, while the maximum effective diameter of the second lens unit L2 lying on the side of the surface R5 is φ81.08 mm; therefore, the effective diameter will not become large.

The projection lens, according to the present embodiment, is constructed so that the best image formation can be obtained when a picture of 4.85 inches in a raster size (the maximum image height is 61.55 mm) on a fluorescent plate (the surface R13) of the flat CRT projection tube is enlarged and projected upon the screen to be a picture of 51 inches.

As is shown in FIG. 11, the projection lens according to the second embodiment has the total focal distance $f_0$=78.00 mm, the brightness F/no=1.03, the angle of field 2ω=69.3°, the lateral magnification M=−1/10.52×, and the projection distance (the distance between the screen and the first lens unit L1) L=916.0996 mm, respectively, in the application thereof.

Figure 13:
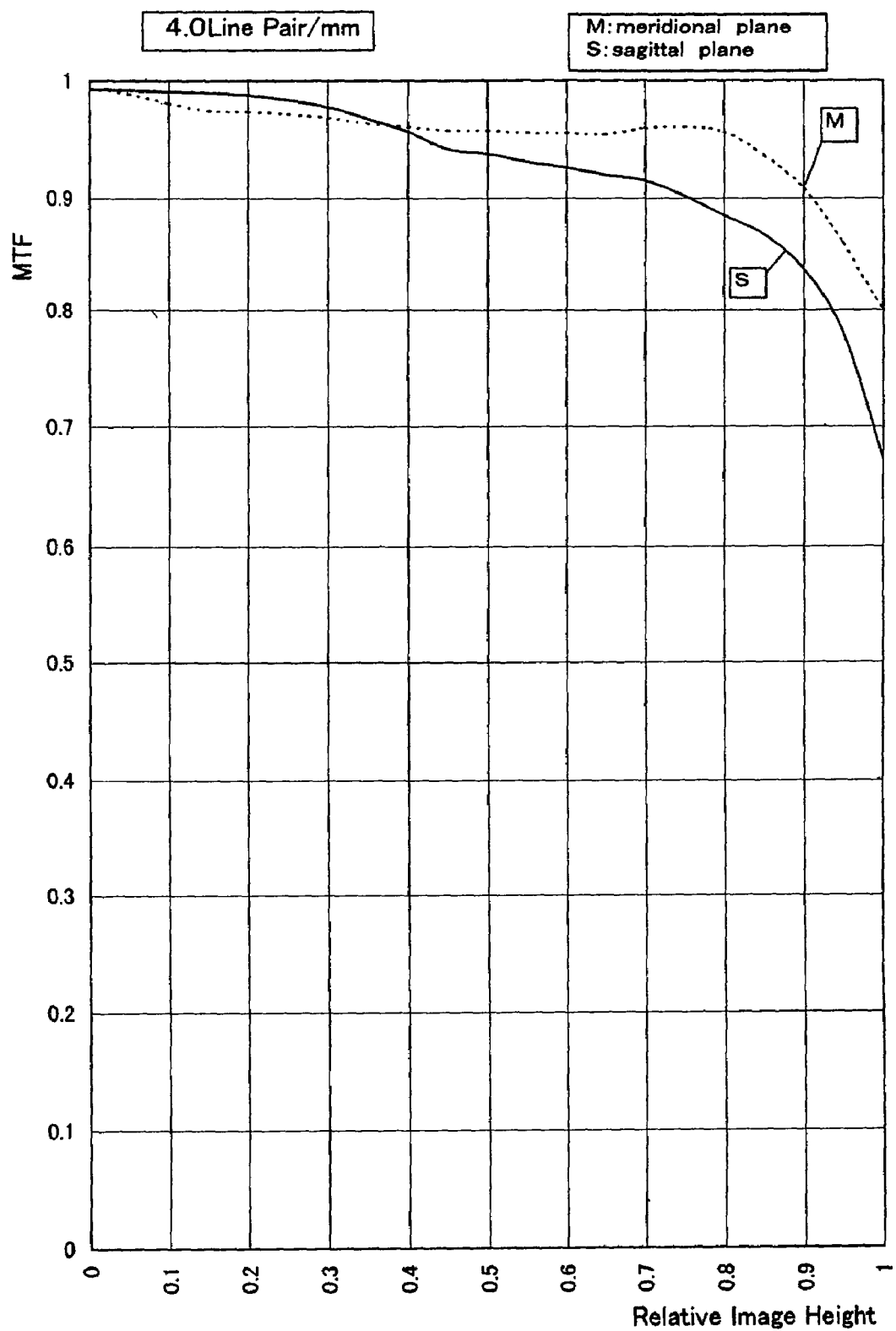
FIG. 13 is a graph for showing the MTF-relative image height characteristic curve of the projection lens, according to the second embodiment of the invention, at resolution of 4 Lp/mm.

FIG. 13 is a graph for showing the MTF characteristic at 4.0 Lp/mm within the projection lens according to the second embodiment. Also, FIG. 14 is a graph for showing the MTF characteristic at 8.0 Lp/mm within the projection lens according to the second embodiment.

From FIG. 13, i.e., the MTF characteristics of the projection lens according to the second embodiment obtained at 4.0 Lp/mm, the resolution is preferable all over the region of the image height, upon both the meridional plane and the sugittal plane, and in particular, the image height is about 0.8 at the lowest, within the region from 0.0 to 0.9 of the image height, upon both the meridional plane and the sugittal plane. With this, it is apparent that the resolution of the projection lens according to the second embodiment is preferable, even if comparing it to the MTF characteristic of the conventional lens shown in FIG. 8, and also that various kinds of aberrations be preferably compensated.

Figure 14:
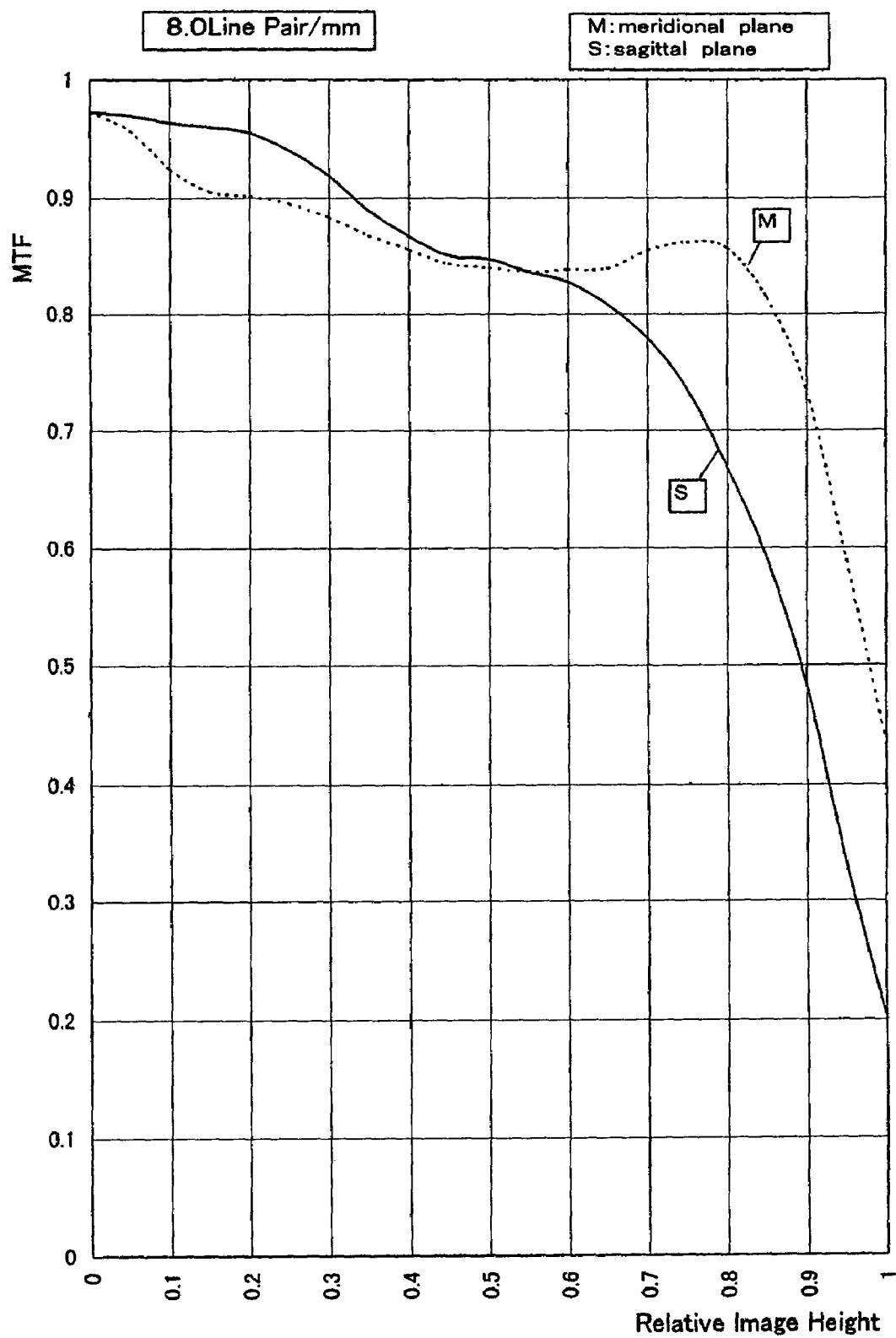
FIG. 14 is a graph for showing the MTF-relative image height characteristic curve of the projection lens, according to the second embodiment of the invention, at resolution of 8 Lp/mm.

Also, from FIG. 14, the MTF characteristic of the projection lens according to the second embodiment at 8.0

Lp/mm is 0.4 at the lowest all over the region of the image height, in relation to the meridional plane, while it is also about 0.4 at the lowest within the regain from 0.0 to 0.9 of the image height in relation to the sugittal plane. With this, it is apparent that the resolution of the projection lens according to the second embodiment is also preferable, even if comparing it to the MTF characteristic of the conventional lens shown in FIG. 9, and that various kinds of aberrations be preferably compensated.

Also, the optical distortion is −3.1%, and the marginal light amount ratio is 29.3% (=light amount at the maximum image height/light amount on the axis); i.e., they are similar to those obtained by the projection lens according to the first embodiment and/or the conventional projection lens.

As was mentioned above, with the projection lens according to the second embodiment, it is also possible to achieve a low cost projection lens of being large in the angle of field and being superior in capacity of the image formation, while keeping the F/no bright.

<C> Third Embodiment

Next, explanation will be given about a projection lens according to the third embodiment of the present invention, by referring to drawings attached herewith.

Figure 15:
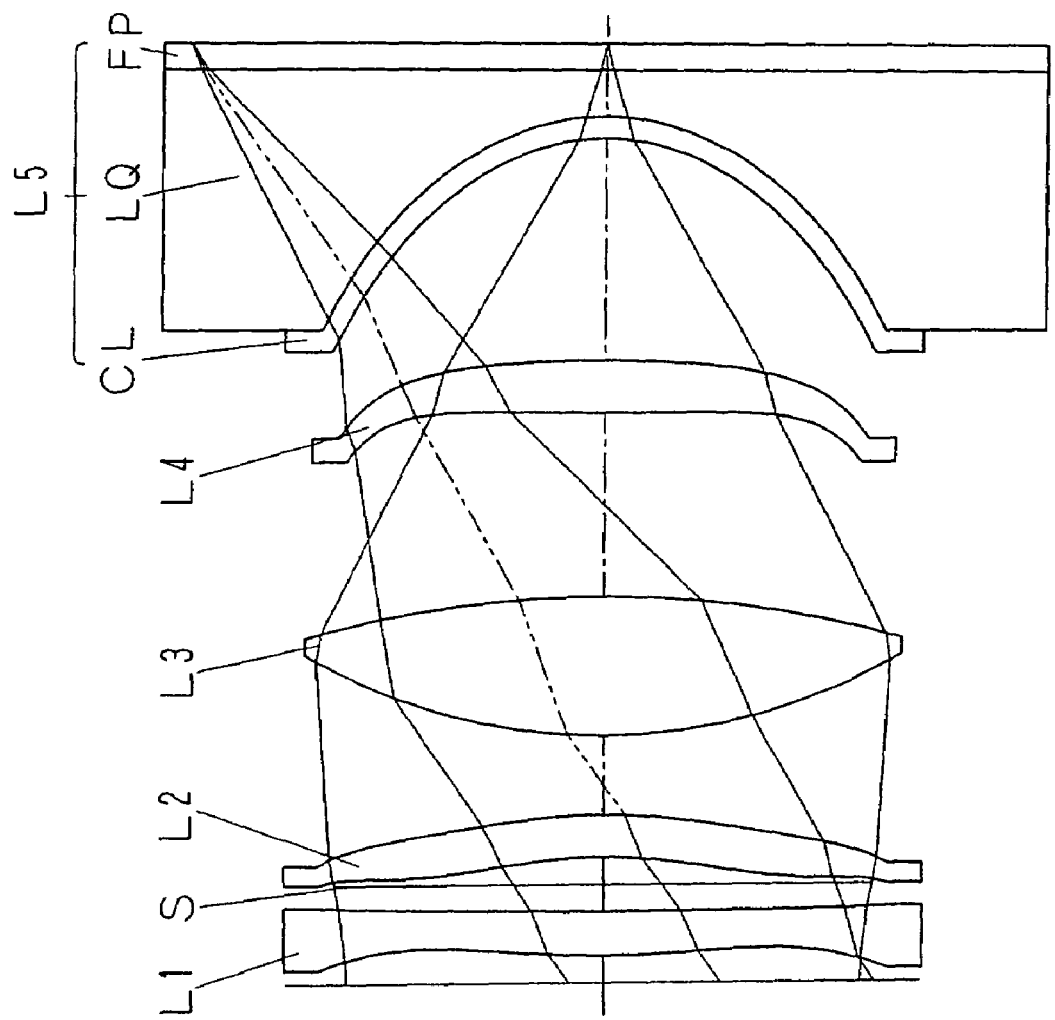
FIG. 15 is a view for showing the lens configurations of the projection lens, according to a third and fourth embodiments of the present invention, tracing light beams therein.

FIG. 15 is a view for showing the lens configuration of the projection lens according to the third embodiment, as well as, tracing light beams while applying concrete numerical values therein. In this FIG. 15, the same or similar parts or elements, which are explained corresponding to those in the first embodiment mentioned above, are shown with attaching the same references thereto.

The third embodiment, although having the refractive indexes same to those on each of the surfaces 1–12 of the respective lens units in the first embodiment, however it is applied into the projection lens, in which changes are made upon the refractive index on the $12^{th}$ surface of the faceplate FP of the fifth lens unit L5, the distances between the respective lens units L1–L5, and also each surface thereof.

FIG. 16 is a table for showing the concrete values of the curvature radiuses R1–R13, the surface distances D1–D12, the refractive indexes Nd1–Nd13 (refractive index at "d" line) and Abbe numbers vd1–vd12 (Abbe number at "d" line) on the $1^{st}$ surface to the $13^{th}$ surface of the surface number, at the optical axis thereof, in the projection lens according to the third embodiment. Further, FIG. 17 is a table for showing the values of the conical constant "k" and the aspheric coefficients A3–A10, for defining the configurations of the $1^{st}$ surface, the $2^{nd}$ surface, the $4^{th}$ surface, the $5^{th}$ surface, the $8^{th}$ surface, the $9^{th}$ surface, the $10^{th}$ surface and the $11^{th}$ surface, each having an aspheric surface.

As is shown in FIG. 15, the projection lens according to the third embodiment is also constructed with the first lens unit L1, the second lens unit L2, the third lens unit L3, the fourth lens unit L4 and the fifth lens unit L5, each being disposed successively from the screen side, and also the stop "S" provided between the first lens unit L1 and the second lens unit L2, wherein each of the functions of the lens units L1–L5 is same to that in the first embodiment.

The first lens unit L1 is made from a single lens in this third embodiment. The first lens unit L1 has a focal distance "$f_1$", $f_1$=354.393 mm, and a ratio $f_0/f_1$ to the total focal distance $f_0$=78.00 mm is $f_0/f_1$=0.220.

The second lens unit L2 is also made from a single lens in this third embodiment. The second lens unit L2 has a focal distance "$f_2$", $f_2$=−1242.676 mm, and a ratio $f_0/f_2$ to the total focal distance $f_0$=78.00 mm is $f_0/f_2$=−0.063.

The third lens unit L3 is also made from a single lens in this third embodiment. The third lens unit L3 has a focal distance "$f_3$", $f_3$=97.206 mm, and a ratio $f_0/f_3$ to the total focal distance $f_0$=78.00 mm is $f_0/f_3$=0.804.

Further, the fourth lens unit L4 is also made from a single lens in this third embodiment. The fourth lens unit L4 has a focal distance "$f_4$", $f_4$=324.601 mm, and a ratio $f_0/f_4$ to the total focal distance $f_0$=78.00 mm is $f_0/f_4$=0.240.

The fifth lens unit L5 has a focal distance "$f_5$", $f_5$=−70.478 mm, and a ratio $f_0/f_5$ to the total focal distance $f_0$=78.00 mm is $f_0/f_5$=−1.107.

However, the condition of the ratio between the focal distance of each of the lens units L1–L5 and the focal distance of the total system are determined in accordance with the same reasons, which were explained in the first embodiment.

Between the first lens unit L1 and the second lens unit L2 is provided an iris or stop "S", which has a diameter $\phi$79.30 mm. The maximum effective diameter of the first lens unit L1 lies on the side of the surface R1, and the value thereof is $\phi$79.02 mm, while the maximum effective diameter of the second lens unit L2 lying on the side of the surface R5 is $\phi$80.74 mm; therefore, the effective diameter does not become large.

The projection lens, according to the present embodiment, is also constructed so that the best image formation can be obtained when a picture of 4.80 inches in a raster size (the maximum image height is 60.93 mm) on a fluorescent plate (the surface R13) of the flat CRT projection tube is enlarged and projected upon the screen to be a picture of 51 inches.

As is shown in FIG. 16, the projection lens according to the third embodiment has the total focal distance $f_0$=78.00 mm, the brightness F/no=1.03, the angle of field 2ω=69.3°, the lateral magnification M=−1/10.63×, and the projection distance (the distance between the screen and the first lens unit L1) L=915.2791 mm, respectively, in the application thereof.

Also, as is shown in FIG. 16, the faceplate FP making up the fifth lens unit L5 of the projection lens according to the third embodiment is made from a material having the refractive index Nd12=1.83274, and it has the Abbe number vd12=52.8 and the thickness thereof is D12=4.000.

Figure 18:
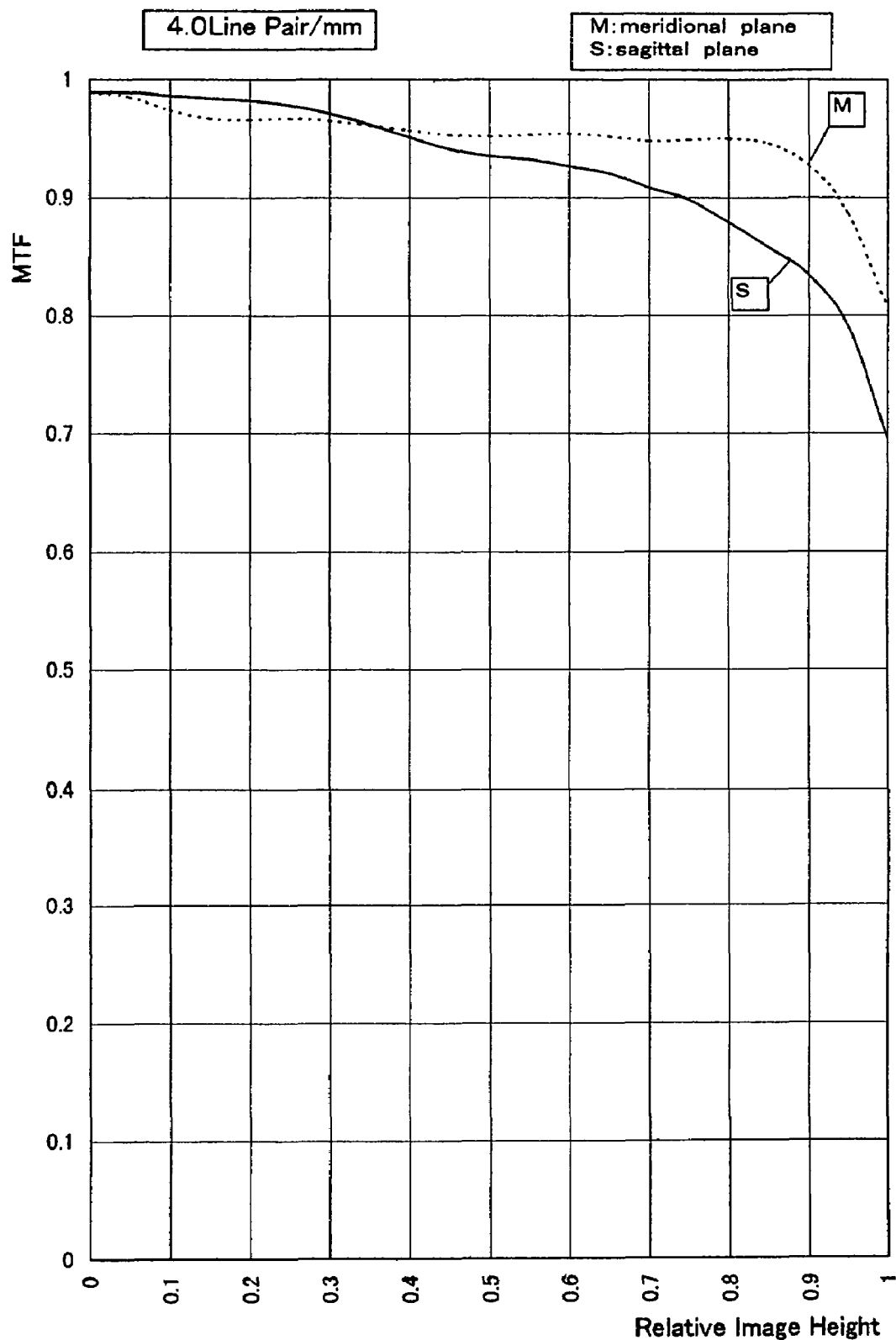
FIG. 18 is a graph for showing the MTF-relative image height characteristic curve of the projection lens, according to the third embodiment of the invention, at resolution of 4 Lp/mm.

FIG. 18 is a graph for showing the MTF characteristic at 4.0 Lp/mm within the projection lens according to the third embodiment. Also, FIG. 19 is a graph for showing the MTF characteristic at 8.0 Lp/mm within the projection lens according to the third embodiment.

From FIG. 18, i.e., the MTF characteristics of the projection lens according to the third embodiment obtained at 4.0 Lp/mm, the resolution is also preferable all over the region of the image height, upon both the meridional plane and the sugittal plane, and in particular, the image height is about 0.8 at the lowest, within the region from 0.0 to 0.9 of the image height, upon both the meridional plane and the sugittal plane. With this, it is apparent that the resolution of the projection lens according to the third embodiment is preferable, even if comparing it to the MTF characteristic of the conventional lens shown in FIG. 8, and that various kinds of aberrations be preferably compensated.

Figure 19:
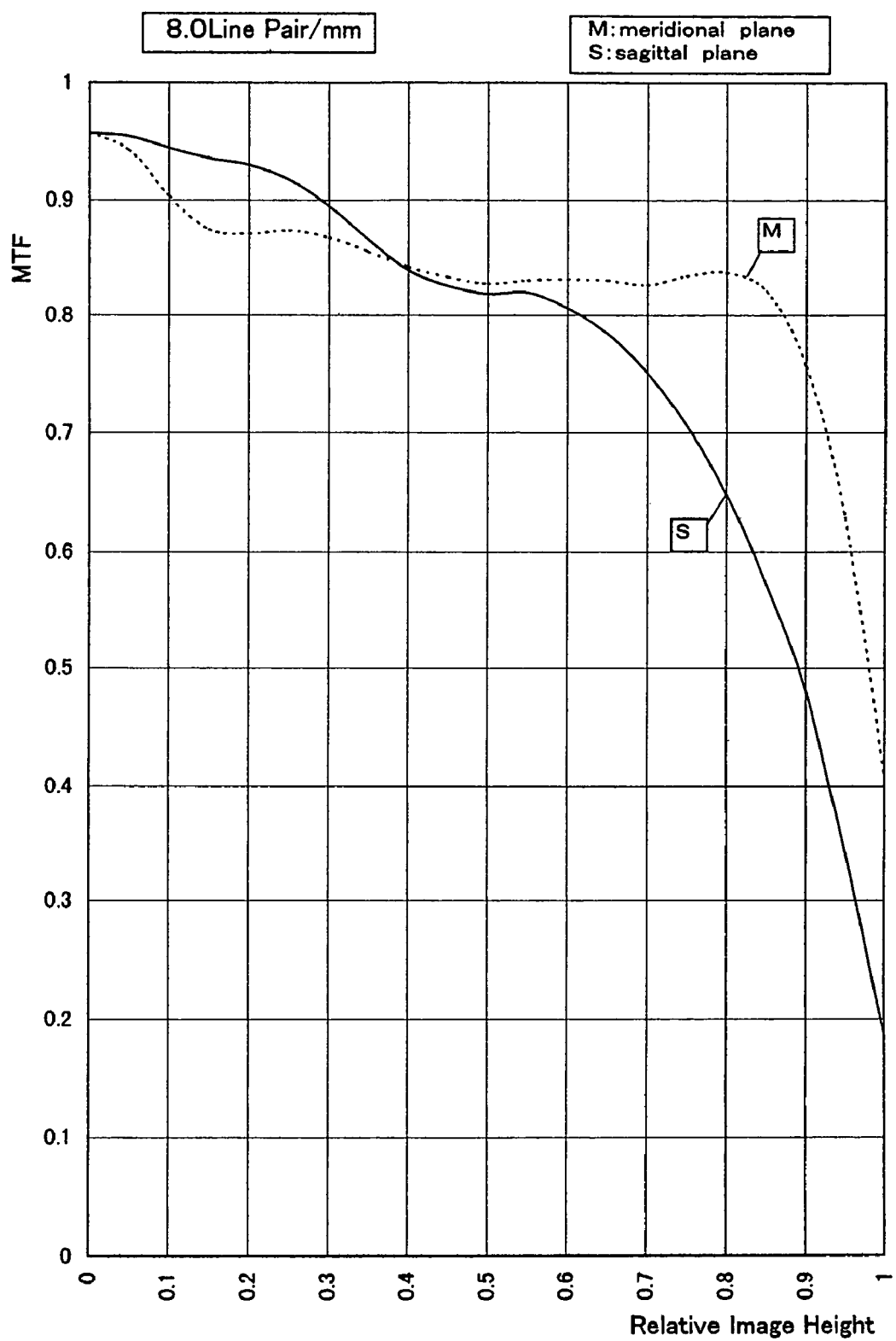
FIG. 19 is a graph for showing the MTF-relative image height characteristic curve of the projection lens, according to the third embodiment of the invention, at resolution of 8 Lp/mm.

Also, from FIG. 19, the MTF characteristic of the projection lens according to the third embodiment at 8.0 Lp/mm is 0.4 at the lowest all over the region of the image height, in relation to the meridional plane, and it is also about 0.4 at the lowest within the regain from 0.0 to 0.9 of the image height, in relation to the sugittal plane. With this, it is also apparent that the resolution of the projection lens according to the third embodiment is also preferable, even if comparing it to the MTF characteristic of the conventional lens shown in FIG. 9, and that various kinds of aberrations be preferably compensated.

Also, the optical distortion is −4.0%, and the marginal light amount ratio is 30.1% (=light amount at the maximum image height/light amount on the axis); i.e., they are similar to those obtained by the projection lens according to the first embodiment and/or the conventional projection lens.

As was mentioned above, with the projection lens according to the third embodiment, it is possible to achieve a low cost projection lens of being large in the angle of field and superior in the capacity of the image formation, while keeping the F/no bright.

<D> Fourth Embodiment

Next, explanation will be given about a projection lens according to the fourth embodiment of the present invention, by referring to drawings attached herewith.

The projection lens according to the fourth embodiment is achieved through changes of the picture size on the screen, but without falling down the image forming capacity; i.e., the change of the projection magnification can be achieved through the lens exchange(s), which is/are necessary but at the minimum thereof.

Within the projection lens according to the third embodiment shown in FIG. 15, but through the changes of surface configuration upon both surfaces of the fourth lens unit, and also the change upon the surface distance D9 between the fourth lens unit L4 and the fifth lens unit L5, the projection lens according to the fourth embodiment can be obtained, by changing the screen size from 51 inches to 62 inches, but without deterioration in the image forming capacity of the peripheral or marginal images.

Accordingly, explanation will be made on the fourth embodiment, by referring to the lens configuration and tracing of the light beams shown in FIG. 15.

FIG. 20 is a table for showing the concrete values of the curvature radiuses R1–R13, the surface distances D1–D12, the refractive indexes Nd1–Nd13 (refractive index at "d" line) and Abbe numbers vd1–vd12 (Abbe number at "d" line) on the $1^{st}$ surface to the $13^{th}$ surface of the surface number, at the optical axis thereof, in the projection lens according to the fourth embodiment. Further, FIG. 21 is a table for showing the values of the conical constant "k" and the aspheric coefficients A3–A10, for defining the configurations of the $1^{st}$ surface, the $2^{nd}$ surface, the $4^{th}$ surface, the $5^{th}$ surface, the $8^{th}$ surface, the $9^{th}$ surface, the $10^{th}$ surface and the $11^{th}$ surface, each having an aspheric surface.

Within the projection lens according to the fourth embodiment, the first lens unit L1 is made from a single lens in this fourth embodiment. The first lens unit L1 has a focal distance "$f_1$", $f_1=354.393$ mm, and a ratio $f_0/f_1$ to the total focal distance $f_0=78.80$ mm is $f_0/f_1=0.222$.

The second lens unit L2 is also made from a single lens in this fourth embodiment. The second lens unit L2 has a focal distance "$f_2$", $f_2=-1242.676$ mm, and a ratio $f_0/f_2$ to the total focal distance $f_0=78.80$ mm is $f_0/f_2=-0.063$.

The third lens unit L3 is also made from a single lens in this fourth embodiment. The third lens unit L3 has a focal distance "$f_3$", $f_3=97.206$ mm, and a ratio $f_0/f_3$ to the total focal distance $f_0=78.80$ mm is $f_0/f_3=0.811$.

Further, the fourth lens unit L4 is also made from a single lens in this fourth embodiment. The fourth lens unit L4 has a focal distance "$f_4$", $f_4=286.151$ mm, and a ratio $f_0/f_4$ to the total focal distance $f_0=78.80$ mm is $f_0/f_4=0.272$.

The fifth lens unit L5 has a focal distance "$f_5$", $f_5=-70.478$ mm, and a ratio $f_0/f_5$ to the total focal distance $f_0=78.80$ mm is $f_0/f_5=-1.118$.

However, the condition of the ratio between the focal distance of each of the lens units L1–L5 and the focal distance of the total system are determined in accordance with the same reasons, which were explained in the first embodiment.

Between the first lens unit L1 and the second lens unit L2 is provided an iris or stop "S", which has a diameter $\phi 79.14$ mm. The maximum effective diameter of the first lens unit L1 lies on the side of the surface R1, and the value thereof is $\phi 78.96$ mm, while the maximum effective diameter of the second lens unit L2 lying on the side of the surface R5 is $\phi 80.52$ mm; therefore, the effective diameter does not become large.

The projection lens, according to the present embodiment, is constructed so that the best image formation can be obtained when a picture of 4.8 inches in a raster size (the maximum image height is 60.86 mm) on a fluorescent plate (the surface R13) of the flat CRT projection tube is enlarged and projected upon the screen to be a picture of 62 inches. As is shown in FIG. 20, the projection lens according to the fourth embodiment has the total focal distance $f_0=78.80$ mm, the brightness F/no=1.03, the angle of field $2\omega=70.3°$, the lateral magnification M=−1/12.94×, and the projection distance (the distance between the screen and the first lens unit L1) L=1,095.9832 mm, respectively, in the application thereof.

Figure 22:
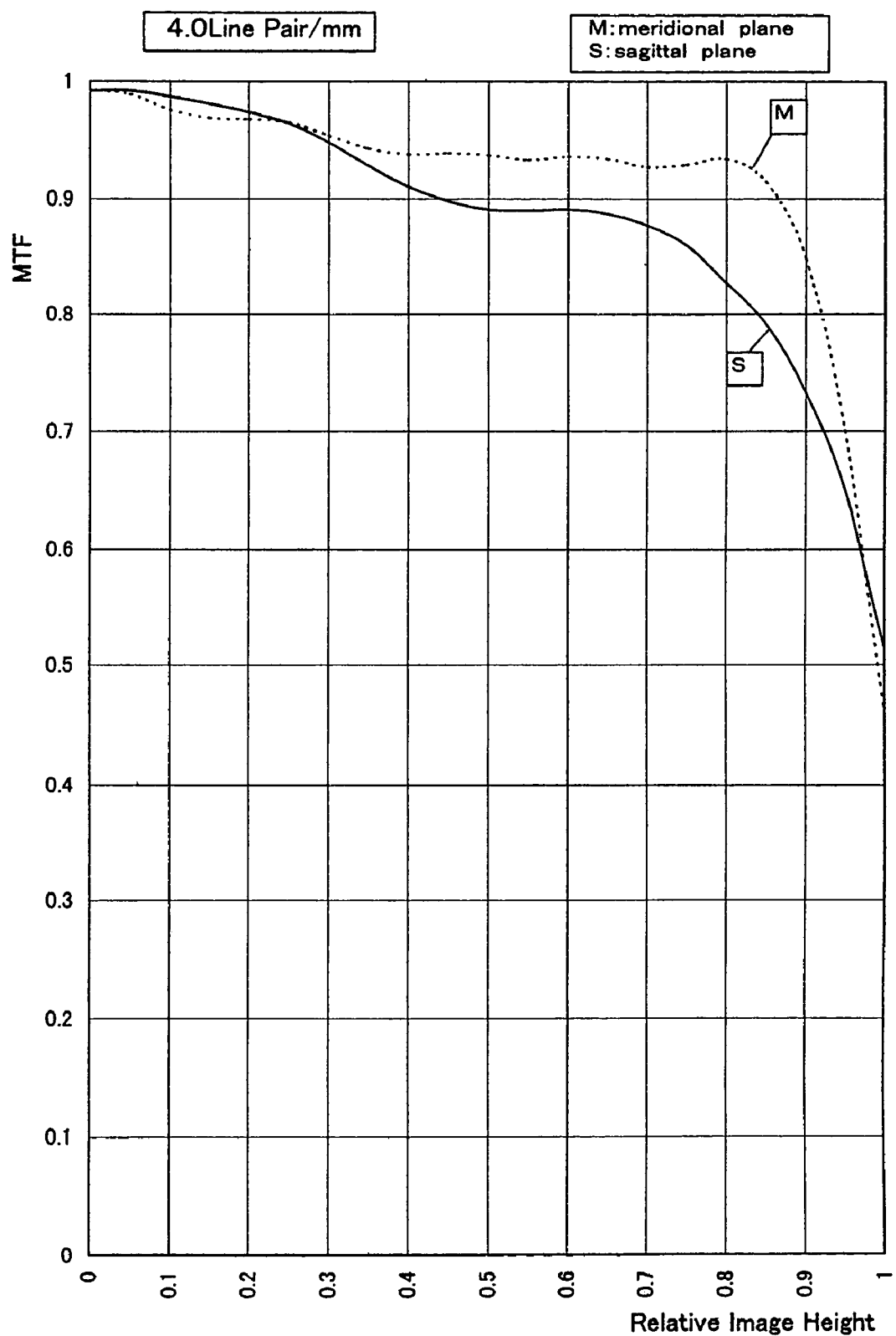
FIG. 22 is a graph for showing the MTF-relative image height characteristic curve of the projection lens, according to the fourth embodiment of the invention, at resolution of 4 Lp/mm.

FIG. 22 is a graph for showing the MTF characteristic at 4.0 Lp/mm within the projection lens according to the fourth embodiment. Also, FIG. 23 is a graph for showing the MTF characteristic at 8.0 Lp/mm within the projection lens according to the fourth embodiment.

From FIG. 22; i.e., the MTF characteristics of the projection lens according to the fourth embodiment obtained at 4.0 Lp/mm, the resolution is also preferable all over the region of the image height, upon both the meridional plane and the sugittal plane, and in particular, the image height is about 0.7 at the lowest, within the region from 0.0 to 0.9 of the image height, upon both the meridional plane and the sugittal plane. With this, it is apparent that the resolution of the projection lens according to the fourth embodiment is preferable, even if comparing it to the MTF characteristic of the conventional lens shown in FIG. 8, and that various kinds of aberrations be preferably compensated.

Figure 23:
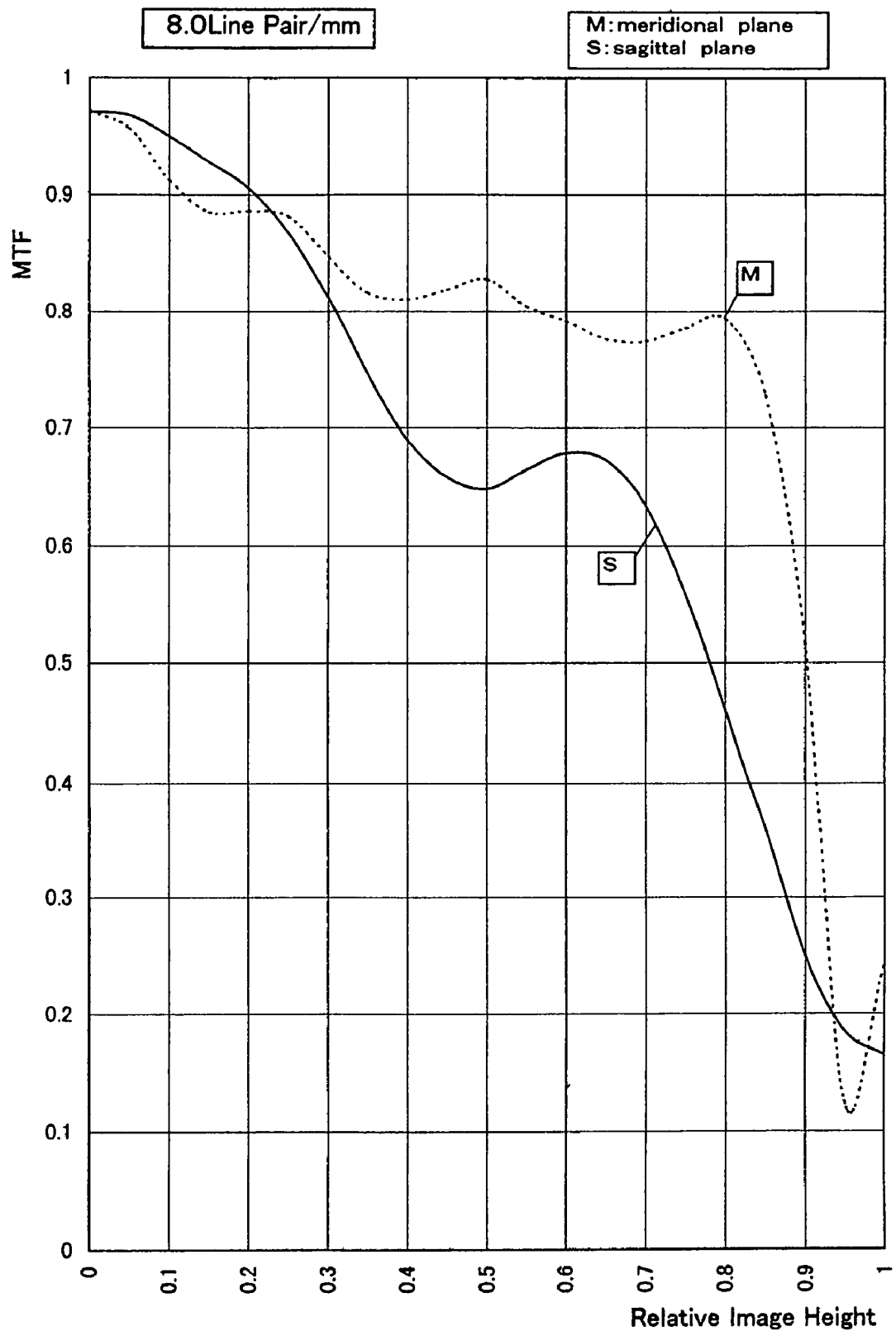
FIG. 23 is a graph for showing the MTF-relative image height characteristic curve of the projection lens, according to the fourth embodiment of the invention, at resolution of 8 Lp/mm.

Also, from FIG. 23, the MTF characteristic of the projection lens according to the third embodiment at 8.0 Lp/mm is about 0.5 at the lowest all over the region of the image height from 0.0 to 0.9, in relation to the meridional plane, and it is equal to 0.4 or less than that at the lowest within the regain of image height from 0.0 to 0.8, in relation to the sugittal plane. With this, it is also apparent that the resolution of the projection lens according to the fourth embodiment is preferable, even if comparing it to the MTF characteristic of the conventional lens shown in FIG. 9, and that various kinds of aberrations be preferably compensated.

Also, the optical distortion is −4.0%, and the marginal light amount ratio is 29.3% (=light amount at the maximum image height/light amount on the axis); i.e., they are similar to those obtained by the projection lens according to the first embodiment and/or the conventional projection lens.

As was mentioned above, with the projection lens according to the fourth embodiment, it is possible to achieve a low cost projection lens of being large in the angle of field and superior in capacity of the image formation, while keeping the F/no bright.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A projection lens, for enlarging and projecting a picture formed on a flat fluorescent plate of a CRT projection tube, comprising:

a first lens unit of a plus lens, having aspheric surfaces on both surfaces thereof, being convex to the screen side at a central portion including an optical axis thereof;

a second lens unit of a minus lens, having aspheric surfaces on both surfaces thereof, being concave to the screen side at a central portion including an optical axis thereof;

a third lens unit of a plus lens, having spherical surfaces on both surfaces thereof, being convex on both sides;

a fourth lens unit of a plus lens, having aspheric surfaces on both surfaces thereof, being curved in concave-like to the screen side, on a peripheral portion far from the optical axis into a radial direction thereof; and a fifth lens unit of a minus lens, being made up with a transparent liquid, commonly serving a faceplate of said CRT projection tube and a cooling, and a meniscus lens, having a thickness being nearly equal to and at least an aspheric surface directing a concave surface thereof to the screen side, being disposed successively from a screen side to said CRT projection tube, wherein the following conditions (1) to (5) are satisfied:

(1) $0.1 < f_0/f_1 < 0.3$;
(2) $-0.15 < f_0/f_2 < -0.01$;
(3) $0.7 < f_0/f_3 < 0.9$;
(4) $0.15 < f_0/f_4 < 0.35$;
(5) $-1.3 < f_0/f_5 < -0.9$;

where, $f_0$ is a focal distance of a total system;
$f_1$ is a focal distance of said first lens unit;
$f_2$ is a focal distance of said second lens unit;
$f_3$ is a focal distance of said third lens unit;
$f_4$ is a focal distance of said fourth lens unit; and
$f_5$ is a focal distance of said fifth lens unit.

2. The projection lens, as described in claim 1, wherein magnification change is conducted through change on a surface of said fourth lens unit and/or change on distance between said fourth lens unit and said fifth lens unit.

3. A projection lens, for enlarging and projecting a picture formed on a flat fluorescent plate of a CRT projection tube, comprising:

a first lens unit of a plus lens, having aspheric surfaces on both surfaces thereof, being convex to the screen side at a central portion including an optical axis thereof;

a second lens unit of a minus lens, having aspheric surfaces on both surfaces thereof, being concave to the screen side at a central portion including an optical axis thereof;

a third lens unit of a plus lens, having spherical surfaces on both surfaces thereof, being convex on both sides;

a fourth lens unit of a plus lens, having aspheric surfaces on both surfaces thereof, being curved in concave-like to the screen side, on a peripheral portion far from the optical axis into a radial direction thereof; and a fifth lens unit of a minus lens, being made up with a transparent liquid, commonly serving a faceplate of said CRT projection tube and a cooling, and a meniscus lens, having a thickness being nearly equal to and at least an aspheric surface directing a concave surface thereof to the screen side, being disposed successively from a screen side to said CRT projection tube, and further comprising:

a stop, being disposed between said first lens unit and said second lens unit, wherein the following conditions (1) to (5) are satisfied:

(1) $0.1 < f_0/f_1 < 0.3$;
(2) $-0.15 < f_0/f_2 < -0.01$;
(3) $0.7 < f_0/f_3 < 0.9$;
(4) $0.15 < f_0/f_4 < 0.35$;
(5) $-1.3 < f_0/f_5 < -0.9$;

where, $f_0$ is a focal distance of a total system;
$f_1$ is a focal distance of said first lens unit;
$f_2$ is a focal distance of said second lens unit;
$f_3$ is a focal distance of said third lens unit;
$f_4$ is a focal distance of said fourth lens unit; and
$f_5$ is a focal distance of said fifth lens unit.

4. The projection lens, as described in claim 3, wherein the faceplate of said CRT projection tube, which builds up said fifth lens unit, is made from a material of a refractive index from 1.65 to 1.85, and has a thickness from 3 mm to 5 mm.

5. The projection lens, as described in claim 4, wherein magnification change is made through change on a surface of said fourth lens unit and/or change on distance between said fourth lens unit and said fifth lens unit.

6. A projection lens, for enlarging and projecting a picture formed on a flat fluorescent plate of a CRT projection tube, comprising:

a first lens unit of a plus lens, having aspheric surfaces on both surfaces thereof, being convex to the screen side at a central portion including an optical axis thereof;

a second lens unit of a minus lens, having aspheric surfaces on both surfaces thereof, being concave to the screen side at a central portion including an optical axis thereof;

a third lens unit of a plus lens, having spherical surfaces on both surfaces thereof, being convex on both sides;

a fourth lens unit of a plus lens, having aspheric surfaces on both surfaces thereof, being curved in concave-like to the screen side, on a peripheral portion far from the optical axis into a radial direction thereof; and a fifth lens unit of a minus lens, being made up with a transparent liquid, commonly serving a faceplate of said CRT projection tube and a cooling, and a meniscus lens, having a thickness being nearly equal to and at least an aspheric surface directing a concave surface thereof to the screen side, being disposed successively from a screen side to said CRT projection tube, wherein the faceplate of said CRT projection tube, which builds up said fifth lens unit, is made from a material of a refractive index from 1.65 to 1.85, and has a thickness from 3 mm to 5 mm, and the following conditions (1) to (5) are satisfied:

(1) $0.1 < f_0/f_1 < 0.3$;
(2) $-0.15 < f_0/f_2 < -0.01$;
(3) $0.7 < f_0/f_3 < 0.9$;
(4) $0.15 < f_0/f_4 < 0.35$;
(5) $-1.3 < f_0/f_5 < -0.9$;

where, $f_0$ is a focal distance of a total system;
$f_1$ is a focal distance of said first lens unit;
$f_2$ is a focal distance of said second lens unit;
$f_3$ is a focal distance of said third lens unit;
$f_4$ is a focal distance of said fourth lens unit; and
$f_5$ is a focal distance of said fifth lens unit.

7. The projection lens, as described in claim 6, wherein magnification change is made through change on a surface of said fourth lens unit and/or change on distance between said fourth lens unit and said fifth lens unit.

* * * * *

UNITED STATES PATENT AND TRADEMARK OFFICE
CERTIFICATE OF CORRECTION

PATENT NO.         : 7,012,764 B2
APPLICATION NO. : 11/041364
DATED                   : March 14, 2006
INVENTOR(S)       : Kobayashi et al.

It is certified that error appears in the above-identified patent and that said Letters Patent is hereby corrected as shown below:

Column 2, lines 23 and 24 "a thickness being nearly equal to" should read -- a nearly uniform thickness, --.

Column 7, line 10 "brining" should read -- bringing --.

Column 11, line 33 "same to" should read -- same as --.

Column 11, line 59 "same to" should read -- the same as --.

Column 12, line 59 "be" should read -- are --.

Column 13, line 2 "be" should read -- are --.

Column 13, line 11 "of being large in the angle of field and" should read -- having a large angle of field and being --.

Column 13, line 22 "falling down" should read -- a decrease of --.

Column 14, line 46 "be" should read -- are --.

Column 14, line 57 "be" should read -- are --.

Column 15, line 24 (claim 1, line 14) delete "in".

Column 15, line 29 (claim 1, line 18) "serving" should read -- serving as --.

Column 15, line 30 (claim 1, line 19) "and a" should read -- and for --.

Column 15, line 31 (claim 1, line 20) "a thickness being nearly equal to" should read -- a nearly uniform thickness, --.

Column 16, line 6 (claim 3, line 20) "a thickness being nearly equal to" should read -- a nearly uniform thickness, --.

Column 18, line 5 (claim 7, line 2) "on" should read -- of --.

UNITED STATES PATENT AND TRADEMARK OFFICE
CERTIFICATE OF CORRECTION

PATENT NO.       : 7,012,764 B2
APPLICATION NO.  : 11/041364
DATED            : March 14, 2006
INVENTOR(S)      : Kobayashi et al.

It is certified that error appears in the above-identified patent and that said Letters Patent is hereby corrected as shown below:

Column 18, line 6 (claim 7, line 3) "on" should read -- of --.

Signed and Sealed this

Sixteenth Day of September, 2008

JON W. DUDAS
*Director of the United States Patent and Trademark Office*